(12) United States Patent
Saptharishi et al.

(10) Patent No.: US 8,655,020 B2
(45) Date of Patent: Feb. 18, 2014

(54) METHOD OF TRACKING AN OBJECT CAPTURED BY A CAMERA SYSTEM

(75) Inventors: Mahesh Saptharishi, Waltham, MA (US); Dimitri A. Lisin, Shrewsbury, MA (US)

(73) Assignee: VideoIQ, Inc., Billerica, MA (US)

( * ) Notice: Subject to any disclaimer, the term of this patent is extended or adjusted under 35 U.S.C. 154(b) by 0 days.

(21) Appl. No.: 13/543,668

(22) Filed: Jul. 6, 2012

(65) Prior Publication Data

US 2012/0274777 A1 Nov. 1, 2012

Related U.S. Application Data

(62) Division of application No. 12/397,276, filed on Mar. 3, 2009, now Pat. No. 8,224,029.

(60) Provisional application No. 61/033,284, filed on Mar. 3, 2008, provisional application No. 61/033,349, filed on Mar. 3, 2008.

(51) Int. Cl.
*G06K 9/00* (2006.01)

(52) U.S. Cl.
USPC .......................... 382/103; 382/159; 382/224

(58) Field of Classification Search
USPC .......................................... 382/103, 159, 224
See application file for complete search history.

(56) References Cited

U.S. PATENT DOCUMENTS

| | | | |
|---|---|---|---|
| 4,639,784 A | 1/1987 | Fling | |
| 4,779,095 A | 10/1988 | Guerreri | |
| 4,931,868 A | 6/1990 | Kadar | |
| 5,091,780 A | 2/1992 | Pomerleau | |
| 5,099,322 A | 3/1992 | Gove | |
| 5,212,547 A | 5/1993 | Otsuki | |
| 5,253,070 A | 10/1993 | Hong | |
| 5,268,967 A | 12/1993 | Jang et al. | |
| 5,473,737 A | 12/1995 | Harper | |
| 5,825,936 A | 10/1998 | Clarke et al. | |
| 6,377,296 B1 | 4/2002 | Zlatsin et al. | |

(Continued)

FOREIGN PATENT DOCUMENTS

EP 1 862 942 12/2007

OTHER PUBLICATIONS

Collins RT et al., "A System for Video Surveillance and Monitoring," Robotics Institute, Proc. American Nuclear Society (ANS) Eight Annual Topical Meeting on Robotics and Remote Systems, Pittsburgh PA; Apr. 1999, 17 pp.

(Continued)

*Primary Examiner* — John Strege
(74) *Attorney, Agent, or Firm* — Stoel Rives LLP

(57) ABSTRACT

A camera system comprises an image capturing device, object detection module, object tracking module, and match classifier. The object detection module receives image data and detects objects appearing in one or more of the images. The object tracking module temporally associates instances of a first object detected in a first group of the images. The first object has a first signature representing features of the first object. The match classifier matches object instances by analyzing data derived from the first signature of the first object and a second signature of a second object detected in a second image. The second signature represents features of the second object derived from the second image. The match classifier determine whether the second signature matches the first signature. A training process automatically configures the match classifier using a set of possible object features.

22 Claims, 14 Drawing Sheets

(56) References Cited

U.S. PATENT DOCUMENTS

| | | | |
|---|---|---|---|
| 6,577,762 | B1 | 6/2003 | Seeger et al. |
| 6,940,998 | B2 | 9/2005 | Garoutte |
| 6,970,083 | B2 | 11/2005 | Venetianer et al. |
| 7,085,403 | B2* | 8/2006 | Ailisto et al. ............... 382/124 |
| 7,221,775 | B2 | 5/2007 | Buehler |
| 7,227,569 | B2 | 6/2007 | Maruya |
| 7,227,988 | B2 | 6/2007 | Curry et al. |
| 7,515,773 | B2 | 4/2009 | Adachi et al. |
| 7,522,752 | B2 | 4/2009 | Adachi et al. |
| 8,094,971 | B2 | 1/2012 | Guerzhoy et al. |
| 2002/0176001 | A1 | 11/2002 | Trajkovic |
| 2003/0002712 | A1 | 1/2003 | Steenburgh et al. |
| 2003/0040815 | A1 | 2/2003 | Pavlidis |
| 2003/0088532 | A1 | 5/2003 | Hampshire, II |
| 2003/0128298 | A1 | 7/2003 | Moon et al. |
| 2004/0218096 | A1 | 11/2004 | Kondo et al. |
| 2005/0002572 | A1 | 1/2005 | Saptharishi et al. |
| 2005/0073585 | A1 | 4/2005 | Ettinger et al. |
| 2005/0104958 | A1 | 5/2005 | Egnal et al. |
| 2006/0045317 | A1 | 3/2006 | Adachi et al. |
| 2006/0045382 | A1 | 3/2006 | Adachi et al. |
| 2006/0279630 | A1 | 12/2006 | Aggarwal et al. |
| 2007/0035622 | A1 | 2/2007 | Hanna et al. |
| 2007/0039030 | A1 | 2/2007 | Romanowich et al. |
| 2007/0064107 | A1 | 3/2007 | Aggarwal et al. |
| 2007/0127773 | A1* | 6/2007 | Ogawa ............... 382/103 |
| 2008/0007620 | A1 | 1/2008 | Wang et al. |

OTHER PUBLICATIONS

Eveland Christopher et al., "Background Modeling for Segmentation of Video-Rate Stereo Sequences," Computer Vision and Pattern Recognition, 1998 Proceedings, 1998 IEEE Computer Society Conference on, 7 pp.

Gavrila, D.M. et al., "Real-Time Object Detection Using Distance Transforms," *1998 IEEE International Conference on Intelligent Vehicles*; pp. 274-279.

McIvor, Alan M., "Background Subtraction Techniques," Proc. of Image and Vision Computing, Auckland, New Zealand, 2000, 7 pp.

Mikić, Ivana et al., "Moving Shadow and Object Detection in Traffic Scenes," 15th International Conference on Pattern Recognition, 2000, 6 pp.

Oren, Michael et al., "A Trainable System for People Detection," Proceedings of Image Understanding Workshop, CBCL and AI Lab, MIT, Cambridge MA, 1997, 8 pp.

Stenger, B. et al., "Topology Free Hidden Markov Models: Application to Background Modeling," IEEE International Conference on Computer Vision, 2001, 8 pp.

Freund, Y. et al. "Experiments with a New Boosting Algorithm," *Machine Learning: Proceedings of the Thirteenth International Conference*, 1996, 9 pp.

Freund, Y. et al. "A Decision-Theoretic Generalization of On-line Learning and an Application to Boosting," *Journal of Computer and System Sciences*, 55, 119-139, 1997, 21 pp.

Freund, Y. et al., "A Short Introduction to Boosting," *Journal of Japanese Society for Artificial Intelligence*, 14(5):771-780, Sep. 1999, 14 pp.

Viola, Paul et al., "Robust Real-Time Face Detection," *International Journal of Computer Vision*, 57(2), 137-154, 2004, 18 pp.

Saptharishi, Mahesh, Sequential Discriminant Error Minimization: the Theory and Its Application to Real-Time Video Object Recognition, Carnegie Mellon University, Pittsburgh PA, 2005, 249 pp.

Bühlmann, Peter et al., "Boosting Algorithms: Regularization, Prediction, and Model Fitting," *Statistical Science*, vol. 22, No. 4, 477-505, 2007, 29 pp.

Polikar, Robi, "Ensemble Based Systems in Decision Making," *IEEE Circuits and Systems Magazine*, 2006, 25 pp.

Office action dated Nov. 14, 2008 for U.S. Appl. No. 10/884,486.

Amendment dated Mar. 16, 2009 for U.S. Appl. No. 10/884,486.

Renno, J., et al., "Learning Surveillance Tracking Models for the Self-Calibrated Ground Plane," *British Machine Vision Conference*, 2002, 10 pp.

Benmokhtar, Rachid, "Neural Network Combining Classifier Based on Dempster-Shafer Theory," *Proceedings of the International Multiconference on Computer Science and Information Technology*, 2006, 8 pp.

Freeman, William T., "Orientation Histograms for Hand Gesture Recognition," Mitsubishi Electric Research Laboratories, Dec. 1994, 8 pp.

Lowe, David G, "Object Recognition from Local Scale-Invariant Features," Proceedings of the International Conference on Computer Vision, Sep. 1999, 8 pp.

Moreno, Plinis, et al., "A Comparative Study of Local Descriptors for Object Category Recognition: SIFT vs. HMAX," Department of Computer Science and Artificial Intelligence, University of Granada, ETSI, 2007, 8 pp.

Lavesson, Niklos, "Quantifying the Impact of Learning Algorithm Parameter Tuning," American Association for Artificial Intelligence, 2006, 6 pp.

International Search Report and Written Opinion, PCT/US2009/035915 Oct. 12, 2009.

\* cited by examiner

METHOD OF TRACKING AN OBJECT CAPTURED BY A CAMERA SYSTEM

RELATED APPLICATIONS

This application is a division of U.S. patent application Ser. No. 12/397,276, filed Mar. 3, 2009, now U.S. Pat. No. 8,224,029, which claims benefit of U.S. Provisional Patent Application No. 61/033,349, filed Mar. 3, 2008, and U.S. Provisional Patent Application No. 61/033,284, filed Mar. 3, 2008, the last two of which are incorporated herein by reference in their entireties.

TECHNICAL FIELD

This disclosure relates generally but not exclusively to video surveillance and more particularly to matching objects represented in multiple images.

BACKGROUND INFORMATION

Automated security and surveillance systems typically employ video cameras or other image capturing devices or sensors to collect image data. In the simplest systems, images represented by the image data are displayed for contemporaneous screening by security personnel and/or recorded for later reference after a security breach. In those systems, the task of detecting objects of interest is performed by a human observer. A significant advance occurs when the system itself is able to perform object detection and tracking, either partly or completely.

In a typical surveillance system, for example, one may be interested in tracking a detected object such as, for example, a human being, a vehicle, or an animal, that moves through the environment. Existing systems capable of tracking detected objects attempt to track objects using motion prediction and tracking of selected features in consecutive frames of video. Other techniques, such as the SIFT method, attempt to precisely represent the appearance of an instance of an object such that the representation can be used to match multiple instances of an object irrespective of their temporal proximity. Known tracking systems, however, suffer from one or more of (1) inability to be trained, (2) lack of integration with object searching, indexing, and classification systems, (3) inadequate object tracking and search performance, and (4) ineffective cross camera tracking capabilities.

DETAILED DESCRIPTION OF EMBODIMENTS

Overview

Figure 1:
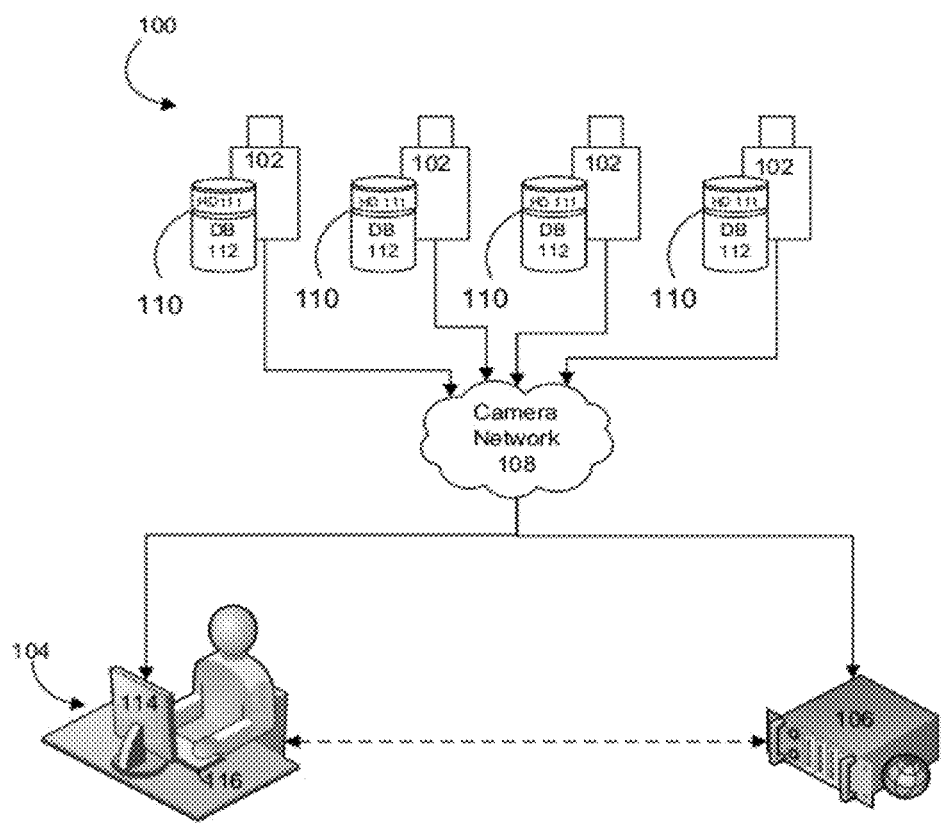
FIG. 1 is a pictorial diagram of a camera system according to one embodiment.

With reference to the above-listed drawings, this section describes particular embodiments and their detailed construction and operation. The embodiments described herein are set forth by way of illustration only and not limitation. Those skilled in the art will recognize in light of the teachings herein that there is a range of equivalents to the example embodiments described herein. Most notably, other embodiments are possible, variations can be made to the embodiments described herein, and there may be equivalents to the components, parts, or steps that make up the described embodiments.

As one skilled in the art will appreciate in light of this disclosure, certain embodiments are capable of achieving certain advantages over the known prior art, including some or all of the following: (1) unifying object tracking, indexing, and searching methods, (2) implementing a trainable match classifier for object tracking, indexing, and searching, (3) ability to search for instances of an object captured prior to a rule violation, (4) ability to recognize previously captured objects after a new object type is added to a detection library, (5) ability to adapt object tracking, indexing, and searching to environmental changes, (6) ability to add new features to optimize detection and classification accuracy, (7) implementing a high-speed tracking system that allows accurate tracking even with relatively low frame rates, (8) implementing an accurate tracking system on an embedded platform using inexpensive hardware, (9) ability to improve object detection accuracy and classification accuracy by feeding back accurate tracking data, and (10) ability to automatically track objects across cameras in real time. These and other advantages of various embodiments will be apparent upon reading the remainder of this section.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

A camera system comprises an image capturing device, an object detection module connected to the image capturing device, an object tracking module connected to the object detection module, and a match classifier connected to the object tracking module. The image capturing device has a field of view and produces image data representing multiple images of the field of view. The object detection module receives the image data and is operable to detect objects appearing in one or more of the multiple images. The object tracking module is operable to temporally associate instances of a first object detected in a first group of the multiple images. The first object has a first signature representing features of the first object derived from the images of the first group. The match classifier is operable to match object instances by analyzing data derived from the first signature of the first object and a second signature of a second object. The second object is detected in a second image distinct from the images of the first group. The second signature represents features of the second object derived from the second image. The match classifier analyzes the first set of data to determine whether the second signature matches the first signature. The match classifier operates to match object instances in a manner that has been determined at least in part by a training process that automatically configures the match classifier using a set of possible object features.

A method tracks an object captured by a camera system. The method captures first and second images of a field of view of the camera system, detects a first object captured in the first image and a second object captured in the second image, and produces a first signature of the first object and a second signature of the second object. The first signature represents a first set of features of the first object and the second signature represents a second set of features of the second object. The method produces data derived from the first and second signatures. The data corresponds to a first subset of features selected from the first set and a second subset of features selected from the second set. A training process automatically determines the features of the first and second sets that are to be selected for inclusion in the first and second subsets. The method analyzes the data to determine whether the second object is an instance of the first object.

A method generates index elements of objects in images captured by a camera system. The method captures a first group of multiple images of an object in a field of view of the camera system, detects the object in the first group of multiple images, and generates a first set of single-frame signatures of the object. The single-frame signatures of the first set correspond to features of the object derived from the multiple images of the first group. The method produces a first average signature of the object. The first average signature is an average of the single-frame signatures of the first set. The first average signature is a first index element of the object. The method produces a cumulative signature of the object. The cumulative signature is a weighted average of the single-frame signatures of the first set. The method captures a second image of the object, detects the object in the second image, and generates a second single-frame signature derived from the second image. The method updates the cumulative signature by weighing the second single-frame signature and averaging the weighted second single-frame signature with the cumulative signature. The method determines whether to accept or reject the updated cumulative signature and the first average signature as a match. The first average signature is updated based on the second single-frame signature when the updated cumulative signature and the first average signature are accepted as a match. A second average signature of the object is produced based on the second single-frame signature when the updated cumulative signature and the first average signature are rejected as a match. The second average signature is a second index element of the object.

A method searches data to identify images of an object captured by a camera system. The method captures a first object in an image of a field of view of the camera system. The first object has a first signature representing features of the first object. The method displays an image of the first object on a display, accepts user input indicative of a selection of the first object, and makes determinations as to whether the first signature matches a group of signatures corresponding to a set of objects captured in images of the field of view of the camera system. The method sends a notification when a second signature of a second object of the set matches the first signature.

A camera system comprises an image capturing device, an object detection module connected to the image capturing device, a user interface connected to the image capturing device, a match classifier, an object tracking module connected to the match classifier and the object detection module, and a search module connected to the match classifier and the user interface. The image capturing device has a field of view and produces image data representing multiple images of the field of view. The object detection module receives the image data and is operable to detect objects appearing in one or more of the multiple images. The user interface includes a display for displaying objects detected by the object detection module and an input device operable to select objects detected by the object detection module in response to user commands. The match classifier is operable to match objects detected by the object detection module. The object tracking module is operable to temporally associate instances of objects detected by the object detection module and is also operable to call on the match classifier to determine whether to associate instances of objects. The search module is operable to retrieve stored images of objects selected by the input device and is also operable to call on the match classifier to locate a stored image of a selected object.

Camera System

FIG. 1 is a pictorial diagram of a camera system 100 according to one embodiment. The camera system 100 includes image capturing devices 102, a user interface 104, and a remote storage/processing unit 106 (e.g., a remote server) connected to each other in a network 108. The network 108 may include any type of wired or wireless network. Although the camera system 100 of FIG. 1 includes multiple image capturing devices 102 connected in a network, the camera system 100 may include a single image capturing device 102. The image capturing devices 102 may include an internal storage system 110, comprising a hard drive (HD) 111, and a metadata database (DB) 112. For example, the image capturing devices 102 may include a storage system described in commonly owned U.S. patent application Ser. Nos. 12/105,971 and 12/105,893, entitled "Content Aware Storage of Video Data" and "Extending the Operational Lifetime of a Hard-Disk Drive Used in Video Data Storage Applications," respectively, both of which are incorporated herein by reference in their entireties. The user interface 104 includes a display 114 and an input device 116. Image capturing devices 102 capture images of their respective fields of view and generate image data representing the images. It is to be understood that images may refer to still images or motion video images. The image data is communicated over the network 108 to the user interface 104, and images of one more of the fields of view are presented on the display 114. The input device 116 is operable to allow a user to provide user feedback information for the camera system 100. Image data may also be communicated over the network 108 to the remote storage/processing unit 106.

Figure 2:
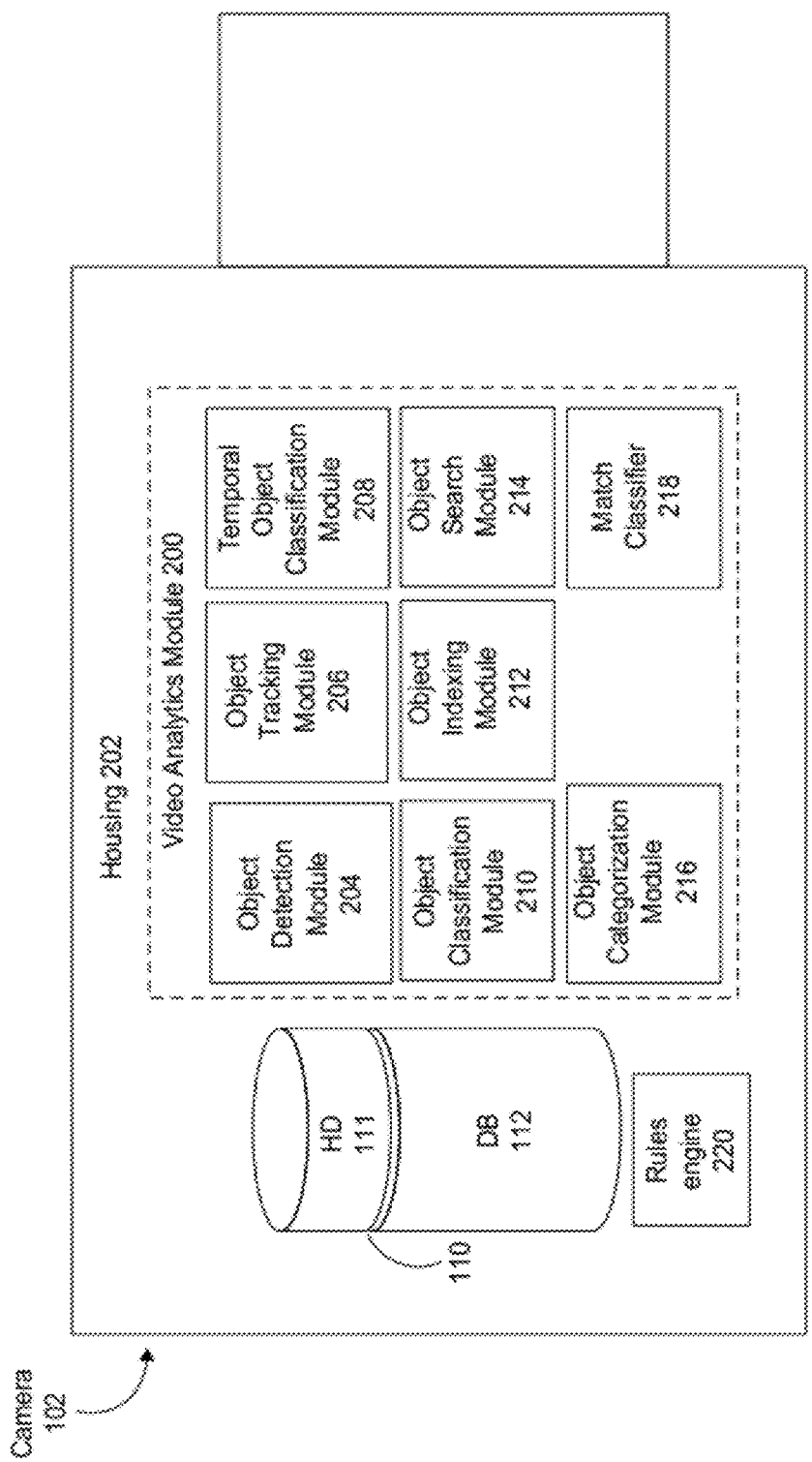
FIG. 2 is a simplified block diagram of one of the image capturing devices in the system shown in FIG. 1.

FIG. 2 is a simplified block diagram of one of the image capturing devices 102. The image capturing device 102 may be a high-resolution video camera such as a megapixel video camera. The image capturing device 102 may also capture data from outside the visible spectrum (e.g., thermal energy). In addition to the storage system 110, the image capturing device 102 includes an image processing unit that includes a video analytics module 200 for analyzing images captured by the image capturing device 102. The image processing unit need not be contained within a housing 202 of the image capturing device 102 as depicted in FIG. 2. Moreover, the remote storage/processing unit 106 may also include an image processing unit.

The video analytics module 200 includes a number of modules for performing various tasks. For example, the video analytics module 200 includes an object detection module 204 for detecting objects appearing in the field of view of the image capturing device 102. The object detection module 204 may employ any known object detection method such as motion detection or blob detection. The object detection module 204 may include the systems and use the detection methods described in commonly owned U.S. Pat. No. 7,627,171, entitled "Methods and Systems for Detecting Objects of Interest in Spatio-Temporal Signals," the entire contents of which are incorporated herein by reference.

The video analytics module 200 also includes an object tracking module 206 connected to the object detection module 204. As used herein, the term "connected" means logically or physically connected directly or indirectly through one or more intermediaries. The object tracking module 206 is operable to temporally associate instances of an object detected by the object detection module 204. The object tracking module 206 generates metadata corresponding to objects it tracks. The metadata may correspond to signatures of the object representing the objects' appearance or other features. The metadata may be transmitted to the metadata database 112 for storage. The object tracking module 206 is described in more detail below.

The video analytics module 200 also includes a temporal object classification module 208. The temporal object classification module 208 is operable to classify an object according to its type (e.g., human, vehicle, animal) by considering the object's appearance over time. In other words, the object tracking module 206 tracks an object for multiple frames (i.e., multiple images), and the temporal object classification module 208 determines the object's type based upon its appearance in the multiple frames. The temporal object classification module 208 may combine information regarding the trajectory of an object (e.g., whether the trajectory is smooth or chaotic, whether the object is moving or motionless) and the confidence of classifications made by an object classification module 210 averaged over multiple frames. For example, classification confidence values determined by the object classification module 210 may be adjusted based on the smoothness of trajectory of the object. The temporal object classification module 208 may assign an object to an unknown class until the object is classified by the object classification module a sufficient number of times and a predetermined number of statistics have been gathered. In classifying an object, the temporal object classification module 208 may also take into account how long the object has been in the field of view. The temporal object classification module 208 may make a final determination about the class of an object based on the information described above. The temporal object classification module 208 may also use a hysteresis approach for changing the class of an object. For example, a threshold may be set for transitioning the classification of an object from unknown to a human, and that threshold may be larger than a threshold for the opposite transition (i.e., from a human to unknown). The temporal object classification module 208 may generate metadata related to the class of an object, and the metadata may be stored in the metadata database 112.

The video analytics module 200 also includes the object classification module 210 connected to the object detection module 204. In contrast to the temporal object classification module 208, the object classification module 210 determines an object's type based upon a single instance (i.e., single image) of the object. The object classification module may include the systems and use the methods described in commonly owned U.S. patent application Ser. No. 12/397,287, entitled "Dynamic Object Classification," the entire contents of which are incorporated herein by reference. The temporal object classification module 208 may aggregate the classifications made by the object classification module 210.

The video analytics module 200 also includes an object indexing module 212 connected to the storage system 110. The object indexing module 212 is operable to generate signatures for objects. The signatures may be stored in the metadata database 112 and may act as index elements for video images of the objects. The object indexing module 212 is described in more detail below.

The video analytics module 200 also includes an object search module 214 connected to the storage system 110 and the user interface 104. The object search module 214 is operable to search through signatures stored in the storage system 110 to identify whether an object was present in previously captured images. The object search module 214 is described in more detail below.

The video analytics module 200 also includes an object categorization module 216 connected to the object classification module 210. The object categorization module 216 is operable to prioritize tracking when multiple objects are detected in an image. For example, the object categorization module 216 is operable to use classification information generated by the object classification module 210 to establish an order for attempting to associate objects of a current frame with objects detected in past frames. The object categorization module 216 is described in more detail below.

Data generated by the video analytics module 200 may be used by a rules engine 220 to determine whether one or more user-specified rules have been violated. For example, the rules engine 220 may trigger an alarm that is presented on the display 114 of the user interface if a human is detected in the field of view of one of the image capturing devices 102.

As used herein, the term "module" is a component that may comprise one or more hardware circuits or devices and/or one or more software routines, functions, object or the like. A module may also be entirely hardware, entirely software, comprise firmware, or comprise some combination of the foregoing. As used herein, the term "system" refers to a tangible thing.

Match Classifier

The video analytics module 200 also includes a match classifier 218 connected to the object tracking module 206, the object indexing module 212, and the object search module 214. The match classifier 218 is operable to receive an input pattern z representing signatures of two objects and determine whether the signatures match (e.g., whether the signatures are sufficiently similar). The match classifier 218 may be used by the object tracking module 206, the object indexing module 212, and the object search module 214 to assist the modules with their various operations. Thus, a unified framework for tracking, indexing, and searching may be achieved via the match classifier 218.

The match classifier 218 is operable to match objects based upon the signatures (e.g., features or appearance characteristics) of the objects. For example, the match classifier 218 receives data (i.e., the input pattern z) related to the signatures of two objects captured in different frames and determines whether the objects correspond to the same physical object.

A signature of an object may be made of a subset of features $\hat{F}=\{f_{k1}, f_{k2}, \ldots, f_{km}\}$ selected from a set of features $F=\{f_1, f_2, f_3, \ldots, f_n\}$. The elements of $\hat{F}$ may be viewed as some transformation of an image region R of an object. Thus, a signature x of an object may take on the following form:

$$x = \begin{pmatrix} \hat{f}_1 = f_{k1}(R) \\ \hat{f}_2 = f_{k2}(R) \\ \vdots \\ \hat{f}_m = f_{km}(R) \end{pmatrix} \quad (1)$$

The features $\hat{f}_1, \hat{f}_2, \ldots, \hat{f}_m$ of an object may correspond to a number of appearance characteristics such as, but not limited to, aspect ratio, hue, intensity, edge orientations, texture, corner features, raw image pixel data, normalized saturation, and localized descriptors such as Scale-invariant feature transform (SIFT) features. The features include both color features (e.g., hue and saturation) and gray-scale features (e.g., intensity and edge orientation). This allows the match classifier 218 to work with both color and black and white images. An image of an object may be divided into regions or subwindows, and the features $\hat{f}_1, \hat{f}_2, \ldots, \hat{f}_m$ may correspond to the appearance characteristics of the object in the regions or subwindows. Moreover, the features $\hat{f}_1, \hat{f}_2, \ldots, \hat{f}_m$ may represent feature vectors (e.g., histograms in which the histogram bins correspond to vector components) of the appearance characteristics and may be used by the match classifier 218 to determine whether objects match. For example, histograms of the edge orientations of an object may be constructed for different regions (e.g., subwindows) of the object's image. In other words, an image of an object may be divided into subwindows, and edge orientations may be calculated for each pixel of the subwindows. The edge orientation of a pixel may be derived using a steerable filter (e.g., using a Gaussian derivative filter in multiple directions). For example, an image may be convolved with a first derivative of a Gaussian distribution oriented at zero and 90 degrees, which may be used as basis filters to synthesize numerous orientations. Gaussian derivative responses may be computed at eight orientations for each pixel, and for each pixel, the orientation with the maximum response may be chosen as the direction for the pixel. Using a steerable filter allows dominant directions to be assigned to the pixels of a subwindow, and allows a histogram of the directions to be constructed for the subwindow. For example, for a given pixel, a steerable filter may be used in multiple directions to generate multiple responses, and the direction corresponding to the maximum directional derivative response is assigned as the direction of the pixel. A signature x of an object may capture the uniqueness of the object while allowing for appearance variations among different instances of the object. Although not required, a signature of an object may be computed with maximum resolution available for the camera system 100 and may not be affected by post-facto down-sampling or compression.

Figure 3:
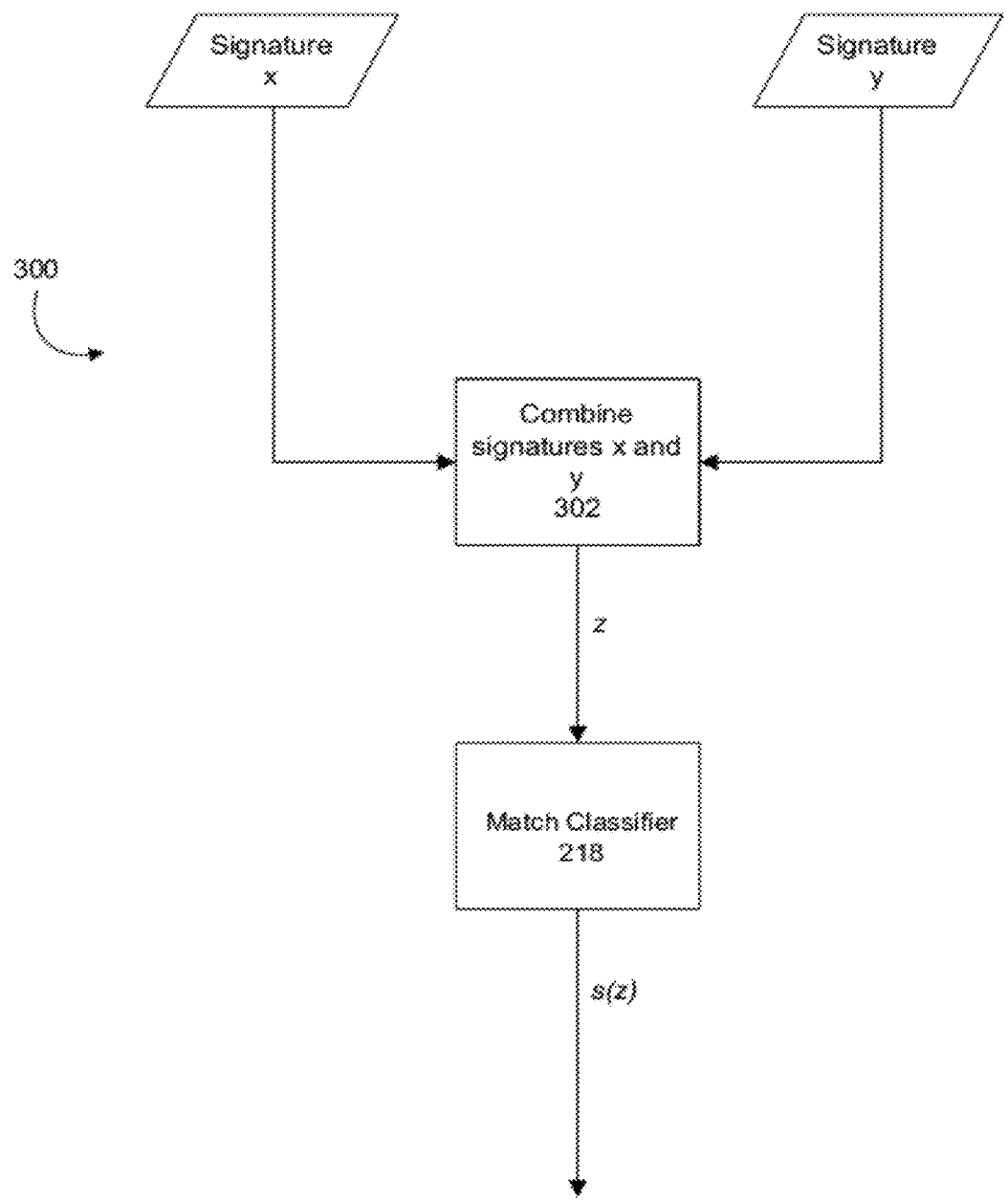
FIG. 3 is a block diagram depicting of a method of generating an input for the match classifier of FIG. 2, according to one embodiment.

FIG. 3 is a block diagram showing a method 300 that may be used to generate an input z for the match classifier 218 based on a signature x from a first object and a signature y from a second object. Generally, the signatures x and y from the first and second object are combined to form the input z (step 302). For example, feature $\hat{f}_1$ of signature x may be combined with feature $\hat{f}_1$ of signature y. The signatures x and y may be combined mathematically using combination functions such as a histogram intersection or a concatenation of features. A combination function may be thought of as a distance measure d between the features. Many different distance measures may be used to come up with the input z such as an $L_1$ distance, a Manhattan distance, an $L_2$ distance, and a Bhattacharyya distance. Thus, many combinations or distance measures are possible for feature $\hat{f}_1$ of the signature x and feature $\hat{f}_1$ of signature y, for example. The distance measures may correspond to a measure of similarity between the features; instances of the same object may be "close" in feature space (e.g., small distance measure), while instances of different objects may be "far away" in feature space (e.g., large distance measure). When combining edge orientation histograms from the signatures x and y, for example, concatenation of the edge orientation histograms may serve as a distance measure d. The input z is supplied to the match classifier 218, and the match classifier 218 makes a decision as to whether the first and second object match. As described below, a training process may automatically choose the best features of the signatures x and y, together with the best combination or distance measure, to achieve a high level of accuracy in matching objects. The output of the match classifier 218 may correspond to a decision step value s(z) as described below. The decision step value s(z) may indicate whether the first and second object match, and may include a value corresponding to a confidence level in its decision.

The match classifier 218 may be represented by a classification problem defined generally by a classifier function $\Gamma(z)$, in which two objects represented by the input pattern z are declared a match when $\Gamma(z)>0$ or as a non-match when $\Gamma(z)<0$. Generally the classifier function $\Gamma(z)$ is parameterized with a set of parameters, and the input z is composed of a combination of the features described above. The magnitude of the output of the classifier function may reflect the level of confidence of the match classifier 218 in its decision. This level of confidence may constitute a measure of similarity (or dissimilarity).

Figure 4:
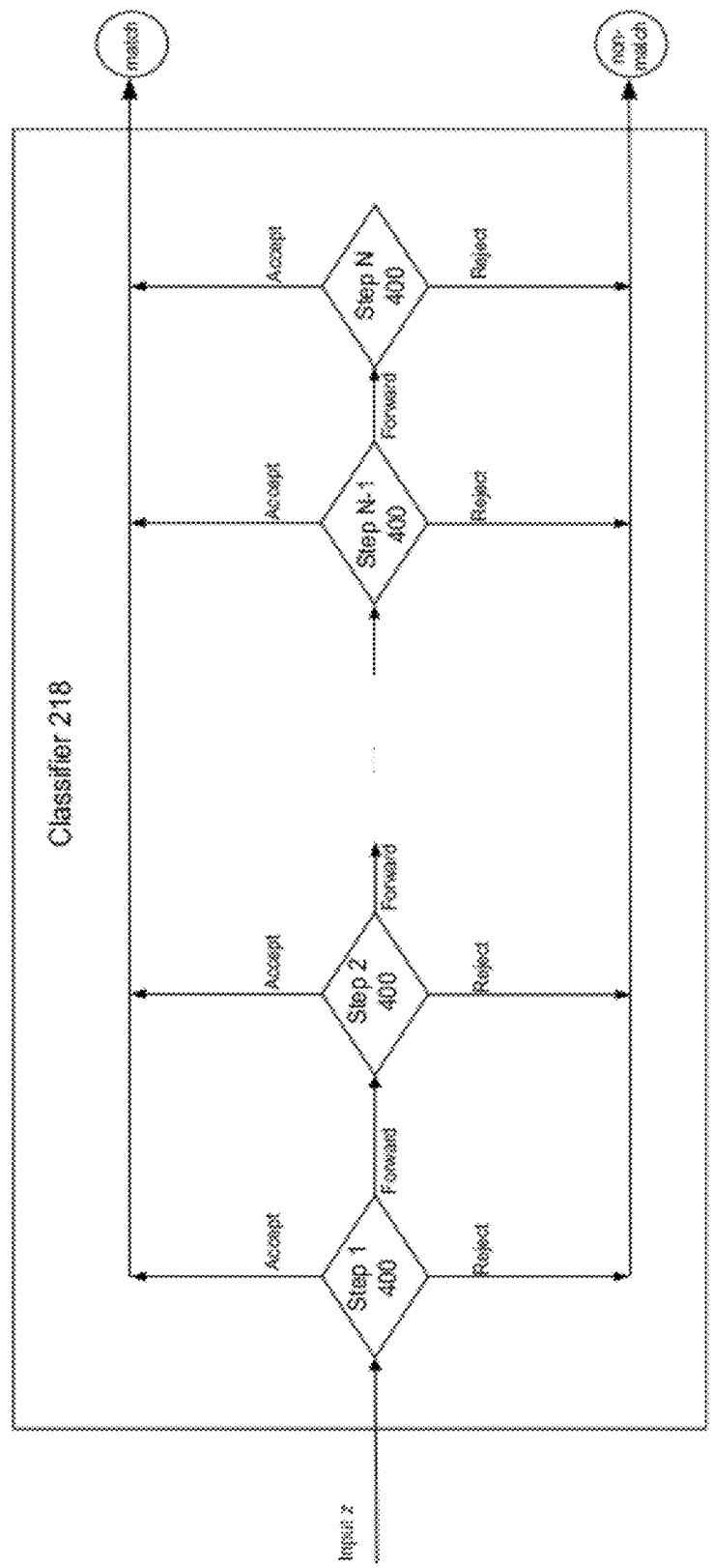
FIG. 4 is a block diagram of the match classifier of FIG. 2.

An embodiment of the structure of the match classifier 218 will now be described in more detail with reference to FIGS. 4-6. The match classifier 218 includes multiple steps 400 (N decision steps) configured in a cascade configuration (i.e., step 1, followed by step 2, followed by step 3, . . . , followed by step N) as shown in FIG. 4. The N steps operate to determine whether two signatures match. Unlike a known cascade classification system proposed in Paul Viola & Michael Jones, "Robust Real-Time Face Detection," International Journal of Computer Vision, pp. 137-154 (2004), each of the initial N−1 steps of the present embodiment is operable to make one of three decisions: (1) accept two objects as a match, (2) reject the objects as a match (i.e., declare a non-match), and (3) forward the decision onto the next step. For example, the input z is supplied to step 1, and step 1 decides whether to (1) accept the objects as a match, (2) reject the objects as a match, or (3) forward the decision to step 2. The decision to accept, reject or forward is based on a value produced by the step (i.e., the decision step value s(z)). The final or Nth step is operable to either (1) accept the objects as a match or (2) reject the objects as match.

Figure 5B:
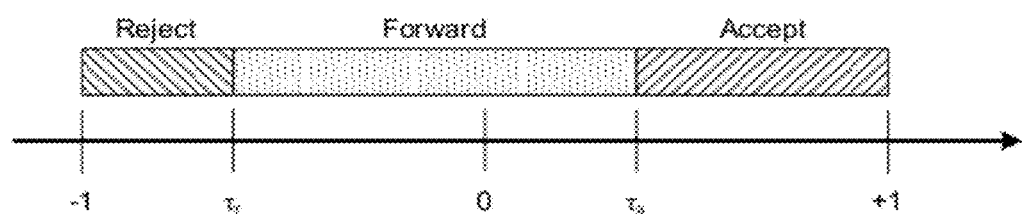
FIG. 5B is a depiction of acceptance and rejection thresholds utilized in the step shown in FIG. 5A.
Figure 5A:
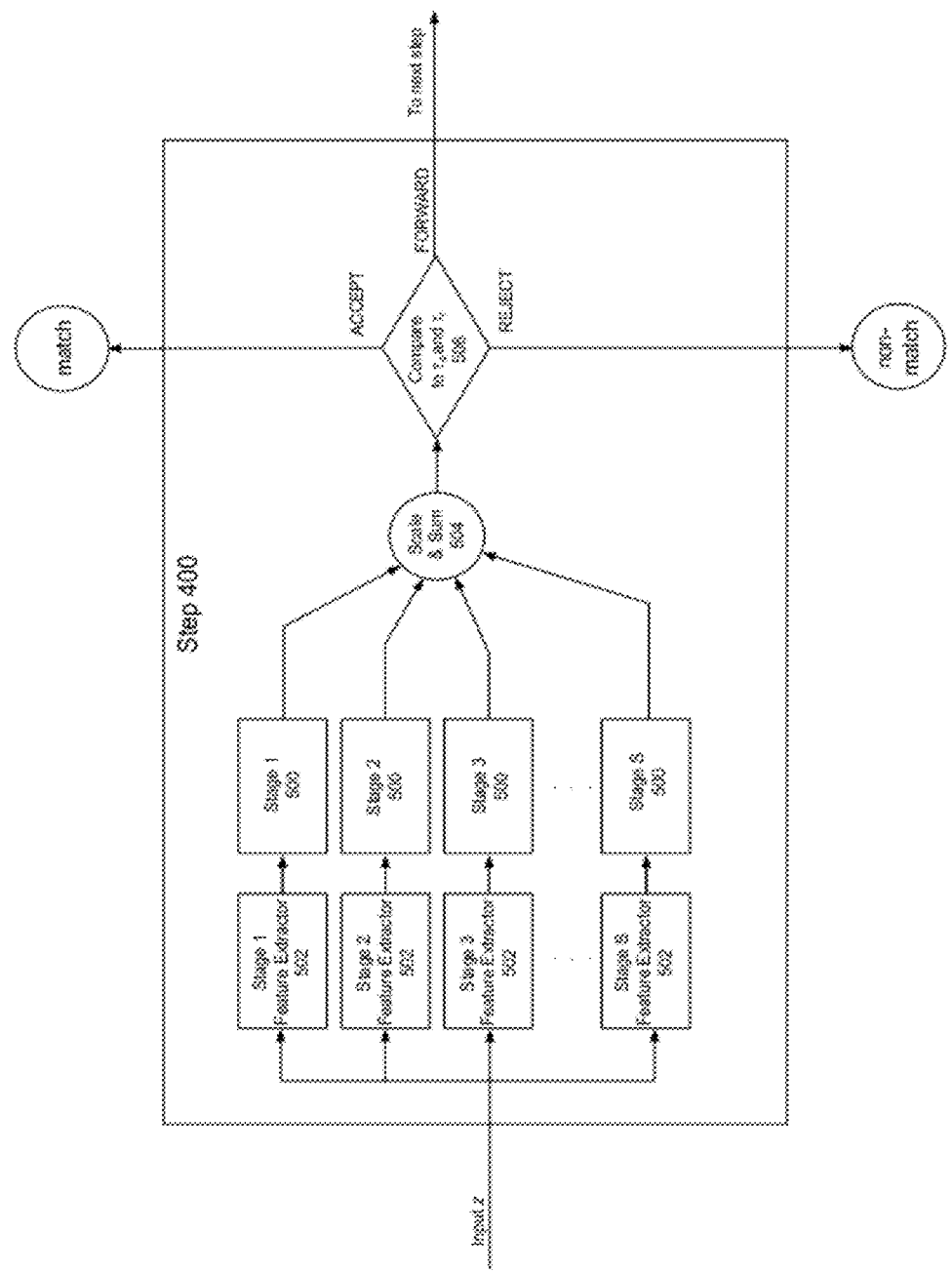
FIG. 5A is a block diagram showing one of the initial N−1 steps in the match classifier shown in FIG. 4.

FIG. 5A is a block diagram showing one of the initial N−1 steps 400 in more detail. Each step 400 includes one or more stages 500. For each of the stages 500, a combination (e.g., a distance measure or concatenation) of one of the features $\hat{f}_1, \hat{f}_2, \ldots, \hat{f}_m$ from a first object and a corresponding one of the features $\hat{f}_1, \hat{f}_2, \ldots, \hat{f}_m$ from a second object is extracted (represented by blocks 502) from the input z and supplied to its corresponding stage 500. For example, a combination of the feature $\hat{f}_1$ from the first object and the feature $\hat{f}_1$ from the second object may be supplied to the first stage 500. Each stage 500, therefore, has a corresponding feature combination associated with it. The stage/feature combination may be predetermined by a learning algorithm during a training process as described below. Moreover, a feature combination supplied to the first stage (stage 1) of FIG. 5A, for example, may be different from or the same as the feature combination supplied to the second stage (stage 2).

In general, a stage 500 may be represented by a stage function g which is defined as follows:

$$g:(x,y) \to \gamma g \in G(x,y) \in z \text{ and } \gamma \in [-1,1] \qquad (2)$$

in which G represents a general set from which the specific stage function g is chosen and (x,y) represents a combination of a feature extracted from signature x and a feature extracted from signature y. As described above, a combination of features supplied to a stage 500 may be considered a distance measure d. The set G may, therefore, be written as G=D×T where D is a set of all possible distance measures calculated at step 302 of FIG. 3 (e.g., d ∈D, d:(x,y)→z) and T represents a set of possible transformations (i.e., mappings) such that for t∈T, t:z→γ. Thus, the stage function g may take on the following expanded form:

$$g_i(\hat{f}_k^x, \hat{f}_k^y) = t(d(\hat{f}_k^x, \hat{f}_k^y)) \qquad (3)$$

A stage 500 represents a discriminant function that includes a weight vector $\vec{w}$ and an activation function β. As noted above, the features $\hat{f}_1, \hat{f}_2, \ldots, \hat{f}_m$ may represent feature vectors. Additionally, a distance measure d between feature vectors may represent a distance vector $\vec{d}$. The stage function may be rewritten as follows:

$$g_i(\vec{d}_k) = \beta_i(\vec{w}_i \cdot \vec{d}_k) \qquad (4)$$

where $\vec{w}_i \cdot \vec{d}_k$ represents the inner product of the weight vector $\vec{w}$ and the distance vector $\vec{d}_k$. The activation function may be any function such as, but not limited to, a sigmoid function or a radial basis function. The activation function $\beta_i$ is used to map the inner product of the weight vector $\vec{w}$ and the distance vector $\vec{d}_k$ to a value between zero and one. The scalar value γ may be determined by calculating a differential of the discriminant function. Unlike known cascade classifiers that include the same discriminant function for all stages, the discriminant functions for the stages of the present embodiment may be different from each other. Moreover, the weight vector $\vec{w}_i$ and activation function $\beta_i$ for each stage 500 are automatically determined during training as described below.

Each step 400 is a linear combination (represented by scale and summing block 504) of one or more of the stages 500. In other words, the scalar values γ of the stages 500 are scaled and summed to produce the decision step value s(z). In general, a step function may be represented mathematically as follows:

$$s(z) = \Sigma_{\forall i} \alpha_i g_i(x_k, y_k) \text{ where } \Sigma_{\forall i} \alpha_i = 1 \qquad (5)$$

Because s(z) (i.e., the decision step value) is a convex combination of stages, s(z) and g(x,y) have the same range. Weighting coefficients α are chosen by a learning algorithm during training. The decision step value is compared (represented by block 506) to one or both of an acceptance threshold $\tau_a$ and a rejection threshold $\tau_r$ to determine whether two objects match, to reject the objects as a match, or to forward the decision to the next step 400. The comparison may be represented as follows:

$$\text{Accept if } \tau_a < s(z) \leq 1 \text{ Forward if } \tau_r < s(z) \leq \tau_a \text{Reject if } -1 < s(z) \leq \tau_r \qquad (6)$$

FIG. 5B illustrates one example of the acceptance and rejection thresholds in the interval [−1,+1]. The acceptance threshold $\tau_a$ and the rejection threshold $\tau_r$ are chosen during training by a learning algorithm based on user-specific false positive and false negative rates. Each step 400 may have values for $\tau_a$ and $\tau_r$ that are different from or the same as the values the other steps 400 have. A decision to "Accept" implies that the classifier is confident that two objects match. A decision to "Forward" implies that the classifier is unsure and defers the decision to the next step. A decision to "Reject" implies that the classifier is confident that two objects do not match. At any step, if the decision is not to "Forward" to the next step 400, the accept/reject decision is made at that point and the evaluation is complete. The decision step value s(z) at that step is the output value for the match classifier 218. The decision step value may correspond to a decision confidence level for the corresponding step 400. For example, a decision step value close to one may represent that the corresponding step 400 is more confident that two objects match compared to a decision step value slightly above the acceptance threshold $\tau_a$. Alternatively, an increase in the decision step value may not necessarily correspond to a higher decision confidence level (i.e., a probability that the decision was correct). The confidence level associated with each decision step value may be empirically estimated during training as objects are correctly and incorrectly matched with different decision step values. The confidence levels of the decision step values are described in more detail below. As noted above, the final stage (stage N) in the match classifier 218 is forced to always accept or reject:

$$\text{Accept if } 0 < s(z) \leq 1 \text{ Reject if } -1 < s(z) \leq 0 \qquad (7)$$

Figure 6:
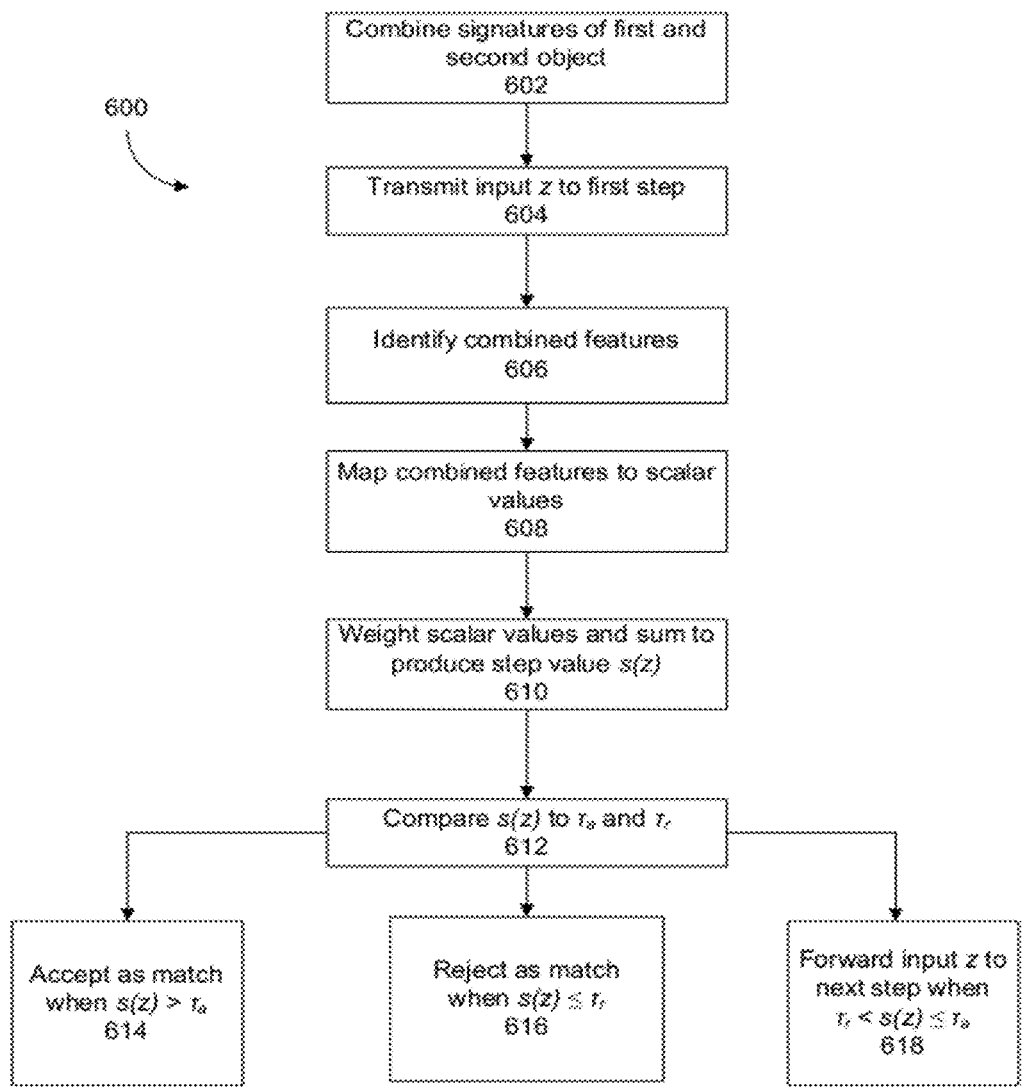
FIG. 6 is a flow chart depicting a method of utilizing the match classifier, according to one embodiment.

FIG. 6 is flow chart depicting an operational flow 600 of the match classifier 218 by way of example. First, the signatures of a first and second object are combined (step 602). The first and second objects may correspond to the same physical object. Step 602 correlates with step 302 of FIG. 3. The input z is transmitted to the first step 400 of the match classifier 218 (step 604). The combined features (e.g., the distance measures) that correspond to the first through $S^{th}$ stages 500 are identified in and chosen from the input z (step 606). Alternatively, rather than transmitting the input z to the first step 400, the combined features used by the stages 500 of the first step 400 may be selected and only those combined features may be transmitted to the first step 400. The combined features are supplied to their respective stages 500, and the stages 500 map the combined features to scalar values y (step 608). The scalar values are scaled (i.e., weighted) and summed to produce a decision step value s(z) (step 610). The decision step value is compared to one or more of the acceptance threshold $\tau_a$ and the rejection threshold $\tau_r$ (step 612). If the decision step value is greater than the acceptance threshold $\tau_a$, the first and second objects are accepted as a match (step 614). If the decision step value is less than or equal to the rejection threshold $\tau_r$, the first and second objects are rejected as a match (step 616). If the decision step value is greater than the rejection threshold $\tau_r$ but less than or equal to the acceptance threshold $\tau_a$, the input z is forwarded to the second step 400 (or, in the alternative, only those feature combinations used by the second step 400 are transmitted to the second step 400) (step 618). The first and second objects may be accepted or rejected as a match at any step 400 within the cascade.

Training the Match Classifier

A method of training the match classifier 218 will now be described. Conventional classifiers may be trained with the learning algorithm AdaBoost or some variant of AdaBoost. While AdaBoost has proved its worth in some applications, the algorithm and objective function used in that learning process have some limitations. For example, for AdaBoost to be effective, distance measures of matching and non-matching objects cannot overlap each other significantly in feature space. In other words, the features of the objects should separate a classification space well. Moreover, because AdaBoost uses weak learners, a large collection of weak learners may be necessary to form a full classifier capable of achieving a desired accuracy.

According to one embodiment, an alternative objective function and learning algorithm called Sequential Discriminant Error Minimization (SDEM) is used to train the match classifier 218. SDEM was proposed in Saptharishi, "Sequential Discriminant Error Minimization: The Theory and its Application to Real-Time Video Object Recognition," (Carnegie Mellon University, 2005), the entire contents of which are incorporated herein by reference. SDEM can deal with features or distance measures that do not necessarily separate a classification space well. Unlike AdaBoost and other similar boosting techniques, SDEM may use weak learners or other discriminant functions that are not necessarily considered weak. Thus, the number of steps 400 and stages 500 of an object classifier may be significantly less using SDEM for training compared to AdaBoost. For a given feature, SDEM is often capable of learning the best classifier for the corresponding feature space. The best features of objects, distance measures, and transformations may be automatically selected for a given classification problem.

Generally, the SDEM algorithm is used to train the combination of stages 500 for each step 400. As defined in equation (3), a stage 500 includes a stage function $g_i(x,y)$ that is equal to a transformation t of a distance measure d of features $\hat{f}_k^x$ and $\hat{f}_k^y$ (i.e., $t(d(\hat{f}_k^x, \hat{f}_k^y))$). The training task chooses the best transformation t, the best distance measure d, and the best feature $\hat{f}_k$, such that when a particular stage 500 is added to a step 400, the performance of the object classifier is maximized. In other words, the SDEM algorithm selects the transformation t, distance measure d, and the feature $\hat{f}_k$ for a particular stage so as to maximize an objective function. The set F of features and the set of distance measures D may be finite, and the set T of transformations may be continuous and differentiable. Following the SDEM algorithm, for each choice of a discrete pair $(\hat{f}_k, d_j)$, a search is performed in the set T to identify the transformation t that performs best on a training data set. The search in the set T may be performed using standard unconstrained optimization techniques such as, but not limited to, a Quasi-Newton optimization method. Once the best transformation t is identified for each choice of $(\hat{f}_k, d_j)$, the best feature/distance measure pair may be selected according to an estimated generalization error $\hat{\epsilon}(g)$. Selection of the best feature/distance measure pair may be written as follows:

$$g(\hat{f}_k^x, \hat{f}_k^y) = \min_{\forall (k,j), \forall t \in T} \{\hat{\epsilon}(t(d_j(\hat{f}_k^x, \hat{f}_k^y)))\} \quad (8)$$

When each stage 500 is added to a step 400, there may be n unique feature types and b unique distance measures. Thus, a total of n X b pairs $(\hat{f}_k, d_j)$ may be explored when adding a new stage 500. One of the properties of the SDEM algorithm is that when a stage 500 is added to a step 400, the addition of the stage 500 improves the performance of the object classifier on the training data set. If a new stage cannot be identified that improves the performance of the object classifier, the SDEM algorithm automatically terminates. Alternatively, rather than waiting for SDEM algorithm to automatically terminate, a number of stages 500 of a step 400 may be determined by a user. In other words, the SDEM algorithm terminates training when a maximum number of stages 500 set by the user is reached or when no stage 500 can be added that will improve performance.

The SDEM algorithm selects a series of features, distance measures, and transformations such that when combined, the series outperforms a single one of the features/distance measures/transformations. For example, while the aspect ratio of an object might be a poor feature to use for matching, when combined with local gradient information, the aspect ratio may improve the matching accuracy corresponding to the local gradient information alone. A number of simple features, distance measures, and transformations may be combined to create a highly accurate match classifier 218. The training task creates super-features by combining a set of appearance features and distance measures for two objects.

Figure 7:
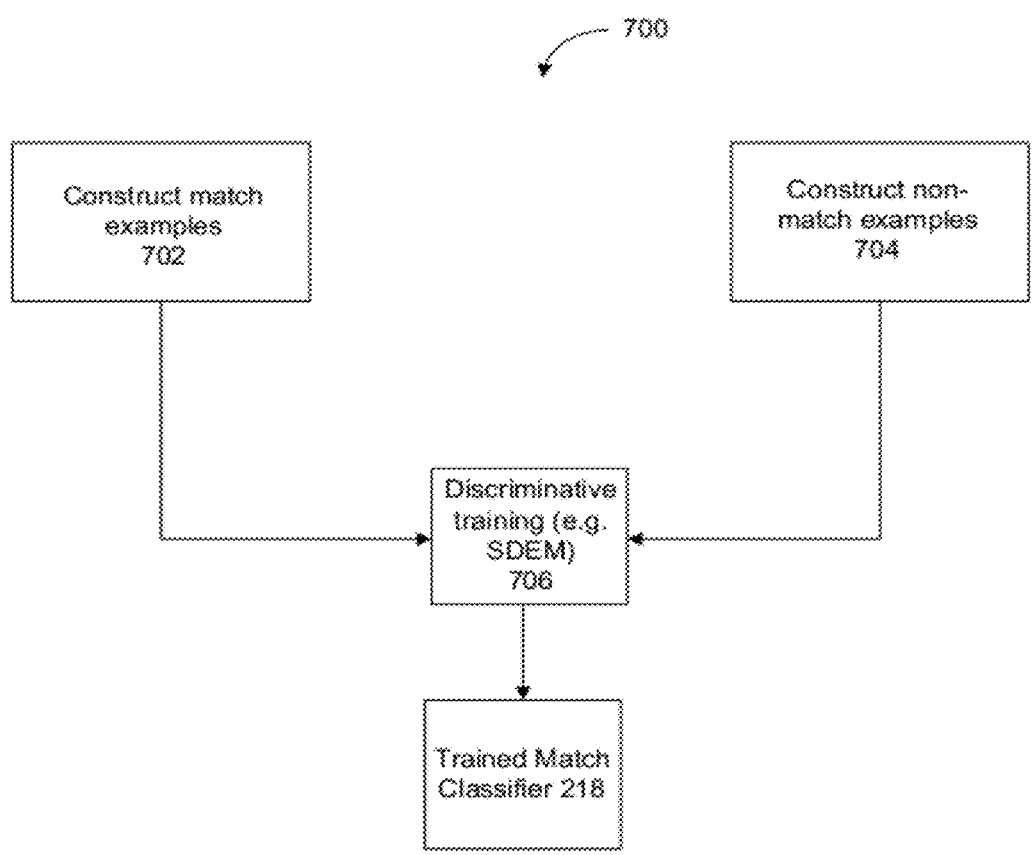
FIG. 7 is a flow diagram of a match classifier training method.

The training task for building the stages 500 of first step 400 will now be described in more detail with reference to FIGS. 7 and 8. The following description is also applicable to the stages 500 of the other steps 400. FIG. 7 is a block diagram of a method 700 of generating training data. A sequence of images of objects may be presented to a user for verification as to whether the images correspond to the same object or different objects. For example, two images may be simultaneously presented, or sequentially presented, to the user for verification. When the images correspond to the same object, a match example is created (step 702). When the images correspond to different objects, a non-match example is created (step 704). Distance measures $d_1, d_2, \ldots, d_m$ are used for the features of the match and non-match examples. The features $\hat{f}_1, \hat{f}_2, \ldots, \hat{f}_k$ of the objects of the match and non-match examples may have more than one distance measure associated with it. For example, b different distance measures may be available for one or more of the features $\hat{f}_1, \hat{f}_2, \ldots, \hat{f}_k$. Thus, $d_1$ and $d_2$ may both correspond to feature $\hat{f}_1$ of the objects. The features $\hat{f}_1, \hat{f}_2, \ldots, \hat{f}_k$ of the match and non-match examples are combined by using one or more of the different distance measures associated with the particular features. For example, if $d_1$ corresponds to $\hat{f}_1$, $d_1$ is used to combine the feature $\hat{f}_1$ of one object of a match example with the feature $\hat{f}_1$ of the other object of the match example. The features $\hat{f}_1$ of the objects of the other match and non-match examples may also be combined. After a number of match and non-match examples are created and the features $\hat{f}_1, \hat{f}_2, \ldots, \hat{f}_k$ of the objects of the examples are combined using the appropriate distance measures $d_1, d_2, \ldots, d_m$, the examples and combinations may be used in a training algorithm to train the match classifier 218 (step 706).

Figure 8:
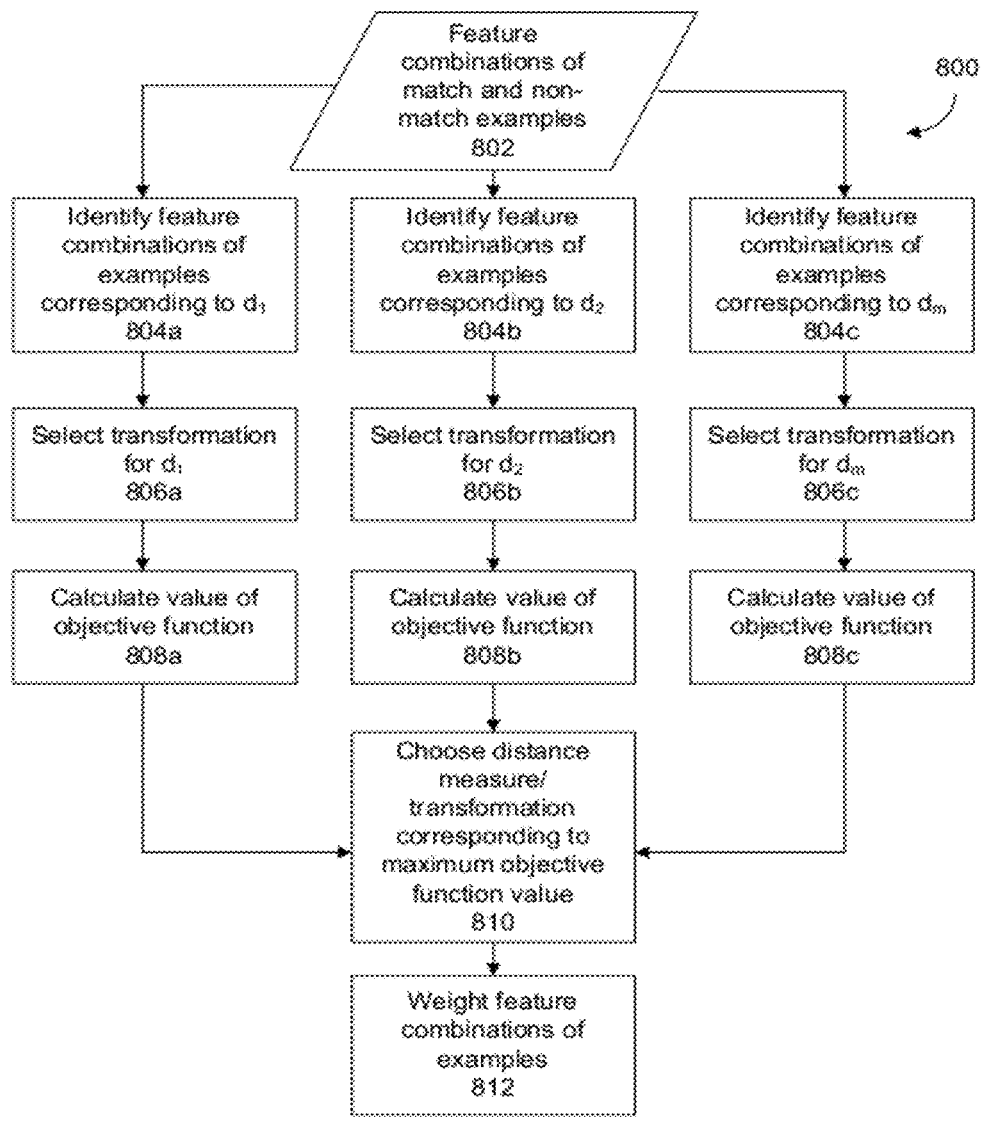
FIG. 8 is a flow chart of a match classifier training method.

FIG. 8 is a flow chart of a training method 800 that may be used to train the match classifier 218. The combinations of features $\hat{f}_1, \hat{f}_2, \ldots, \hat{f}_k$ of the objects of the match and non-match examples (i.e., feature combinations 802) are identified and associated with the distance measures (e.g., $d_1, d_2$) that were used to combine the features (steps 804a, 804b, 804c). For example, for the distance measure $d_1$, the combinations of the appropriate feature $\hat{f}$ formed by using $d_1$ are identified (step 804a).

After the feature combinations 802 corresponding to the distance measures $d_1, d_2, \ldots, d_m$ are identified, the best transformation t is selected for each of the distance measures $d_1, d_2, \ldots, d_m$ (steps 806a, 806b, and 806c). Because a particular feature $\hat{f}$ is associated with each distance measure, the best transformation is selected not only for the distance measure, but also for the feature associated with the distance measure. The transformations may be selected based on standard optimization techniques. A transformation t may be viewed as a decision boundary that separates the feature combinations 802 of the match and non-match examples. Thus, the best transformation t corresponds to a decision boundary that best separates the match and non-match examples for the corresponding feature $\hat{f}$ and distance measure. In the context of the discriminant function made up of the weight vector $\vec{w}_i$ and the activation function $\beta_i$, selection of the best transformation t corresponds to selection of the activation function $\beta_i$ and the components of the weight vector $\vec{w}_i$ that best separate the match and non-match examples. The activation function $\beta_i$ may be selected from a set of multiple function types such as, but not limited to, a sigmoid function and a radial basis function (e.g., a Gaussian function). Thus, unlike known cascade classifiers, a first stage may include a different type of discriminant function compared to a second stage.

After the transformations for the distance measures $d_1, d_2, \ldots, d_m$ are selected, a value of an objective function corresponding to each distance measure/transformation combination is calculated (steps 808a, 808b, and 808c). The objective function may be proportional to a measure of errors (e.g., declaring a match a non-match or vice versa) or it may be a nonlinear but monotonically varying function of the classification errors. The calculated values of the objective function may be related to the number and/or severity of classification errors made by the different distance measure/transformation combinations. For example, a first calculated value may be related to the number of classification errors made by the distance measure $d_1$ and its corresponding transformation. The calculated values of the objective function are compared, and the distance measure/transformation combination that has the maximum calculated value is selected for the first stage 500 of the first step 400 (step 810).

After the distance measure (and its associated feature) and transformation are selected for the first stage 500, the feature combinations 802 of the different match and non-match examples are weighted with different weights taking into account the decisions made by the first stage 500 (step 812). Each of the feature combinations 802 of the match and non-match examples may be thought of as corresponding to data points in function space. The feature combinations 802 of the match and non-match examples may be weighed as a function of how close their corresponding data points are to the decision boundary represented by the first stage 500. For example, the feature combinations 802 corresponding to data points close the decision boundary in feature space may be weighed with higher weights compared to feature combinations 802 with data points far away from the decision boundary so that a second stage 500 may be trained by focusing more on those feature combinations 802 that somewhat confused the first stage 500. The distance between a data point and the decision boundary of the first stage 500 may be related to the scalar value $\gamma$ calculated for the example corresponding to the data point.

After the feature combinations 802 of the examples are weighted, the best transformations are again selected for the distance measures $d_1, d_2, \ldots, d_m$ (steps 806a, 806b, and 806c are repeated). The feature combinations 802 corresponding to the distance measures $d_1, d_2, \ldots, d_m$ however, are now weighted, and the best transformation t for each of the distance measures $d_1, d_2, \ldots, d_m$ is selected taking into account the first stage 500. The best transformation t may correspond to the transformation that results in the greatest increase of the objective function value. The values of the objective function are again calculated and compared to determine the distance measure/transformation for the second stage 500 (steps 808a, 808b, 808c, and 810 are repeated). To build a third stage 500, the feature combinations 802 of the match and non-match examples are re-weighted, in which the examples that were somewhat confusing to the first and second stages 500 are given higher weights. Again, steps 806a, 806b, and 806c are repeated, but feature combinations 802 corresponding to the distance measures $d_1, d_2, \ldots, d_m$ are now re-weighted, and the best transformation t for each of the distance measures $d_1, d_2, \ldots, d_m$ is selected taking into account the first and second stages 500. The values of the objective function are again calculated and compared to determine the distance measure/transformation for the third stage 500 (steps 808a, 808b, 808c, and 810 are repeated). The process of choosing the best distance measure, transformation, and weighting the feature combinations 802 of the examples through each iteration of training a new stage may be thought of as a gradient ascent in function space, or as a process to increase the total value of the objective function.

Once the first step 400 is trained, the thresholds $\tau_a$ and $\tau_r$, are selected such that desired false positive and false negative rates may be attained. Moreover, as the stages 500 are constructed for the first step 400, the weighting coefficients $\alpha$ are also selected. For example, as each stage 500 is added to the first step 400, the weighting coefficients $\alpha$ for the stages are adjusted to find the values for the weighting coefficients $\alpha$ that correspond to the lowest overall error rate for the first step 400. For example, the weighting coefficients $\alpha$ may be selected by using a line search optimization strategy.

After the first step 400 is trained, the stages 500 of a second step 400 may be trained. However, fewer than all of the match and non-match examples used to train the first step 400 may be used to train the second step 400. For example, only those match and non-match examples that the first step 400 could neither accept nor reject may be used to train the second step 400. In other words, the second step 400 is trained with the examples that had a corresponding decision step value greater than the rejection threshold $\tau_r$, but less than or equal to the acceptance threshold $\tau_a$. This allows the second step 400 to focus only on those examples that the first step 400 found confusing.

Figure 9:
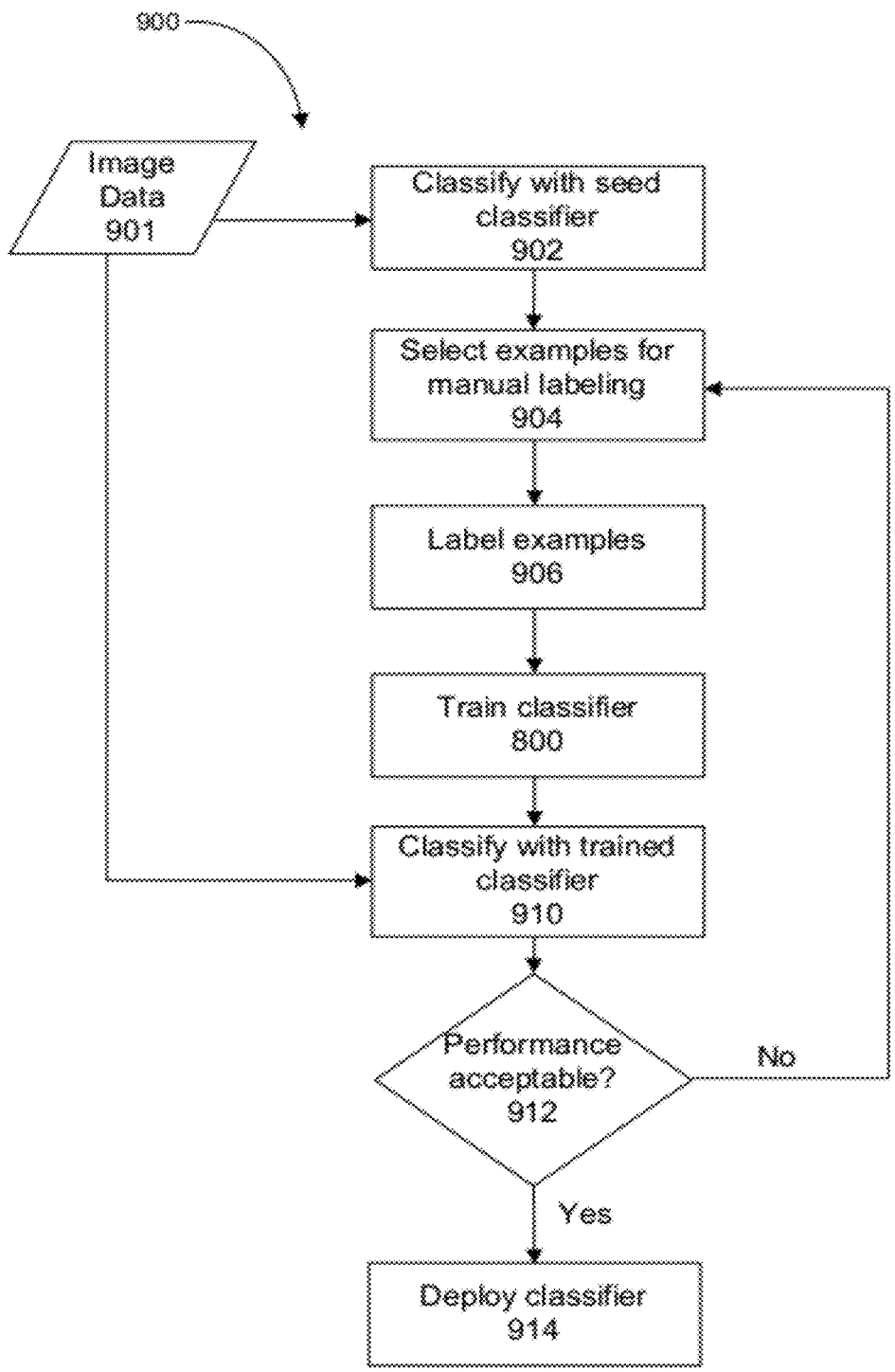
FIG. 9 is a flow chart of another match classifier training method.

Once the match classifier 218 is trained with the examples, the match classifier 218 may continue through other training steps to refine the distance measures/transformations selected for the different stages 500. A high-level approach to training the match classifier 218 is shown in the flow chart of FIG. 9, which illustrates a training method 900. Image data 901 (e.g., raw video data) is supplied to a simple base or seed system that is capable of basic detection, tracking, and classification of objects. The base system detects, tracks, and classifies objects represented in the image data 901 and generates metadata corresponding to the objects (step 902). The base system selects a set of objects that are detected and tracked (step 904). The selection of the objects may depend on the amount of time an object was in the field of view of an image capturing device 102, or may depend on how confident the base system was in its classification of an object. Other rules may be specified for dictating whether an object is selected by the base system.

Images of the objects selected by the base system are presented on a display to a user so the user can manually label the objects as match or non-match examples. The user manually labels the objects, and the labeled examples are supplied to the match classifier 218 being trained (step 906). Feature combinations may be calculated for the labeled examples using the distance measures $d_1, d_2, \ldots, d_m$. The feature combinations of the manually labeled examples may correspond to the feature combinations 802 described above. The match classifier 218 is trained with the feature combinations 802 such as according to the training method 800 as described above with reference to FIG. 8 (step 800). Image data 901 are supplied to the match classifier 218. The match classifier 218 determines whether objects represented in the image data 901 match and generates metadata representing matched and non-matched objects (step 910). Each match and non-match generated by the match classifier 218 has a match confidence level associated with it. The match confidence level corresponds to the decision step value of the step 400 that declared the match or non-match. The match confidence levels generated by the match classifier 218 are analyzed to identify instances of objects that were confusing to the match classifier 218 (e.g., matches and non-matches with a low match confidence levels). The performance of the match classifier 218 is evaluated to determine whether the match classifier's performance is acceptable (step 912).

To determine whether the match classifier's performance is acceptable, a disjoint test set may be used in which matches and non-matches of the disjoint test set are known prior to classification by the match classifier 218. The image data 901 supplied to the match classifier 218 may correspond to the disjoint test set, and the classifications made by the trained object classifier may be compared to the actual matches and non-matches. From this comparison, the performance of the match classifier 218 may be determined. If the performance is not equal to or above some predefined performance level, the confusing objects are presented to the user for manual labels (step 904). The user labels the confusing objects and the new labeled matches and non-matches are used to retrain the match classifier 218 (steps 906 and 908). When the match classifier 218 is retrained, the distance measure/transformation combinations for the different stages 500 may be updated based on the new labeled examples. The retrained match classifier is used to classify objects represented in the image data 901 and the performance of the retrained match classifier is evaluated (steps 910 and 912). The retraining process may continue until the performance of the match classifier 218 is acceptable. When the performance of the match classifier 218 is acceptable, it may be deployed (step 914). The training process may be recast into the following steps:

1. Manually label some small fraction of a dataset.
2. Train a match classifier 218 using the fraction of the dataset.
3. Use a newly trained classifier to automatically label the complete dataset.
4. Select a set of automatically labeled data points that were confusing to the match classifier 218.
5. Manually label the confusing data points.
6. Repeat the training with all the new labeled data points.
7. Go to step 3.

Given the steps-of stages architecture of the match classifier 218, a new step may be added to the match classifier 218. This new step may be trained to correct mistakes made by the match classifier 218. Alternatively, a new step may be trained to replace the last or $N^{th}$ step of the match classifier 218. After the match classifier 218 is trained by the process described above, the match classifier 218 may perform various operations such as tracking, generating indexing elements, and performing object-based (e.g., appearance-based) searches. In other words, the match classifier 218 need not be trained separately for each of its various operations.

The manner in which the match classifier 218 operates to match object instances has been determined at least in part by a training or self-learning process that automatically configures the match classifier 218 using a set of possible object features. That configuration may include one or more of the following determinations: (1) selecting which features from the set of possible features to use; (2) determining the order in which the selected features are evaluated; (3) determining how multiple features are combined (i.e., the weighting coefficients used to combine multiple variables); (4) selecting distance measures from a set of available distance measures (e.g., $L_2$, Manhattan, Bhattacharyya). Other aspects of the match classifier 218 may be configured during the training process. The training process may take place off-line prior to deployment of the match classifier 218 and/or on-line during on-line operation of the match classifier 218.

Match Confidence

The decision step value $s(z)$ is correlated with the match classifier's estimate as to how similar it thinks two objects are (e.g., match confidence). The correlation may not be linear, i.e., the step 400 may generate a high positive value, but the objects may not match. Typically, by virtue of the training process, the higher the value of $s(z)$, the less likely that the step 400 made a mistake. The confidence level associated with a certain value of $s(z)$ may be calculated by first defining an indicator function $\epsilon(\Gamma(z))$ in which:

$$\varepsilon(\Gamma(z) = s(z)) = \begin{cases} 0, \text{ Instances match and } s(z) > 0 \\ 0, \text{ Instances do not match and } s(z) \le 0 \\ 1, \text{ Instances match and } s(z) \le 0 \\ 1, \text{ Instances do not match and } s(z) > 0 \end{cases} \quad (9)$$

A confidence function $\Psi(\Gamma(z))$, may be defined as the probability that the step 400 declared two instances to be a match, and that it was correct for an output of $s(z)=v$. Thus, for a small quantization interval $[v-\Delta, v+\Delta]$, the confidence function may be expressed as follows:

$$\Psi(\Gamma(z)=P_{\epsilon,\Omega|\Gamma}(\epsilon(\Gamma(z))=0,\omega=\text{match}|s(z)<v+\Delta)-P_{\epsilon,\Omega|\Gamma}(\epsilon(\Gamma(z))=0,\omega=\text{match}|s(z)<v-\Delta) \quad (10)$$

Note, it may be considered that the step 400 declares two instances to be a match when $s(z)>0$, i.e., $P_{,\Omega|\Gamma}(\omega=\text{match}|s(z)>0)=1$. Thus, for $v>0$, equation (10) can be expressed as:

$$\Psi(\Gamma(z))=P_{\epsilon|\Omega,\Gamma}(\epsilon(\Gamma(z))=0|\omega=\text{match},0<s(z)\le v+\Delta)-P_{\epsilon|\Omega,\Gamma}(\epsilon(\Gamma(z))=0|\omega=\text{match},0<s(z)<v-\Delta) \quad (11)$$

Equation (11) represents the true positive rate when $v\in[\Delta,1-\Delta]$ and $s(z)\epsilon[v-\Delta,v+\Delta]$.

Similarly, the confidence of a step 400 in declaring that the object belongs to the negative class for $v\le\Delta$ may be expressed as:

$$\Psi(\Gamma(z))=P_{\epsilon|\Omega,\Gamma}(\epsilon(\Gamma(z))=0|\omega=\text{no match},v+\Delta\le s(z)\le 0)-P_{\epsilon|\Omega,\Gamma}(\epsilon(\Gamma(z))=0|\omega=\text{no match},v-\Delta<s(z)\le 0) \quad (12)$$

Equation (12) represents the true negative rate when $v\in[-1+\Delta,-\Delta]$ and $s(z)\epsilon$ $[v-\Delta,v+\Delta]$. Thus, if the probability (as defined in equations (11) and (12)) that the step 400 is correct for any observed output value $s(z)=v$ is high, then the step 400 is considered to be confident in its answer. For this self assessment of confidence, a probability measure $\hat{p}_{\epsilon|\Omega,\Gamma}$ is estimated from the training examples and the confidence function $\Psi(\Gamma(z))$ is inferred. If the confidence function $\Psi(\Gamma(z))$ is less than a critical confidence threshold $\psi_c$ for a given output value for $s(z)$, then the step 400 is considered to be diffident or confused for that output value. Diffident classifications are forwarded to the next step 400. Thus, the confidence function $\Psi(\Gamma(z))$ may be used during training to identify the objects that are confusing to an match classifier 218. If discriminant functions that constitute the stages 500 are a good approximation to the Bayes optimal decision boundary, then the decision step value $s(z)$ will be monotonically related to the confidence function $\Psi(\Gamma(z))$. For the initial steps 400, the object classifier may not approximate the Bayes decision boundary well. Thus, the decision step value $s(z)$ for a given step 400 and the confidence function $\Psi(\Gamma(z))$ may not always be monotonically related.

The confidence function $\Psi(\Gamma(z))$ may be used to determine the acceptance threshold $\tau_a$ and the rejection threshold $\tau_r$ for the different steps 400. As opposed to other cascade classifier architectures, if the confidence function $\Psi(\Gamma(z))$ for matches is monotonically increasing with the decision step value s(z), the acceptance threshold $\tau_a$ may be chosen such that true positive constraints are met. If the confidence function $\Psi(\Gamma(z))$ does not increase monotonically with the decision step value s(z), then the acceptance threshold $\tau_a$ may remain saturated at 1, i.e., no instances are accepted as matches in the corresponding step 400. The lack of monotonicity indicates that in the match region, the decision boundary does not reflect the Bayes optimal classifier sufficiently well. Similarly, the rejection threshold $\tau_r$ is chosen if the non-match confidence is monotonically related to the decision step value s(z). In practice, the non-match class may be far more densely populated in feature space than the match class. Thus, while the monotonic relationship may not exist for the match class in early steps, it most likely exists for the non-match class in the early steps. The match confidence level corresponding to the match classifier 218 is the classification confidence associated with the decision step value s(z) generated by the step 400 that either accepted or rejected a match.

Tracking

Tracking may be thought of as locating an object in each video frame or image, and establishing correspondences between moving objects across frames. Tracking may be performed within a single image capturing device 102 or across multiple image capturing devices 102. In general, the object tracking module 206 may use object motion between frames as a cue to tracking, while also relying on the match classifier 218 for tracking. Using the match classifier 218 for tracking may enable accurate tracking even when some occlusion is present, motion is somewhat erratic, and a fair number of crisscrossing objects are present in the field of view of an image capturing device 102.

Figure 10:
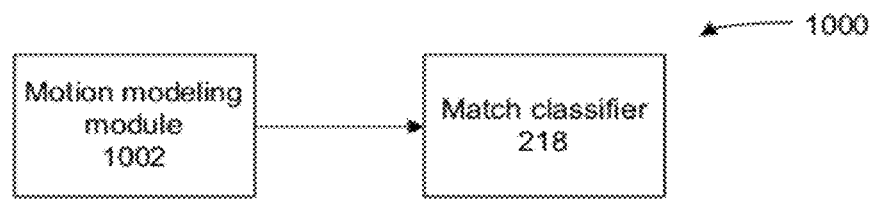
FIG. 10 is a block diagram of an object tracking system.

FIG. 10 is a block diagram of a system 1000 used by the object tracking module 206 for tracking objects. The object tracking module 206 includes a motion modeling module 1002 that is operable to estimate changes of location of an object between sequential images or frames of a field of view of an image capturing device 102. The motion modeling module 1002 may predict the location and size of an object in a new frame based upon its previously estimated trajectory and velocity. The motion modeling module 1002 may be used to rank observations of objects in a current frame by their likelihood or probability of corresponding to a particular object that is being tracked. The object tracking module 206 may generate a list of tracked objects or targets that have been detected in previous frames. For example, the list of tracked objects may include ten objects, the current frame may include five detected objects, and a ranking (e.g., one through five with one being the highest ranking) of the five detected objects may be generated for each of the ten tracked objects based upon match probability information. The object tracking module 206 may generate an identification number or another type of identification symbol for each object that it tracks. The motion modeling module 1002 may use a Kalman filter to predict the position and velocity of an object.

After the motion modeling module 1002 ranks objects of the current frame by their likelihood of corresponding to tracked objects, the object tracking module 206 may call on the match classifier 218 to determine whether an object of the current frame corresponds to a tracked object. For a given tracked object, the object tracking module 206 may call on the match classifier 218 to first determine whether the highest ranked object of the current frame matches the tracked object. Moreover, the object tracking module 206 may use match probability information to determine an order for the tracked objects. For example, if the motion modeling module 1002 determines that the probability of a match between a first tracked object and its highest ranked object is greater than the probability of a match between a second tracked object and its highest ranked object, then the object tracking module 206 may call on the match classifier 218 to attempt to match the first tracked object with its highest ranked object before attempting to match the second tracked object with its highest ranked object. Although the motion modeling module 1002 has been described as being used prior to the match classifier 218, the motion modeling module 100 may be used before or after the match classifier 218. In general the motion modeling module 1002 may be used in conjunction with the match classifier 218. The motion modeling module 1002 may be used to help determine the confidence of a match or non-match declared by the match classifier 218. For example, the match classifier 218 may declare that two objects are a match, but the motion modeling module 1002 may determine that the two objects are too far apart in the field of view to correspond to the same object. In that case, the motion modeling module 1002 may be used to increase the acceptance threshold $\tau_a$. The match confidence level associated with the match classifier 218 may then be analyzed in conjunction with determinations made by the motion modeling module 1002 to declare a match or non-match.

Figure 11:
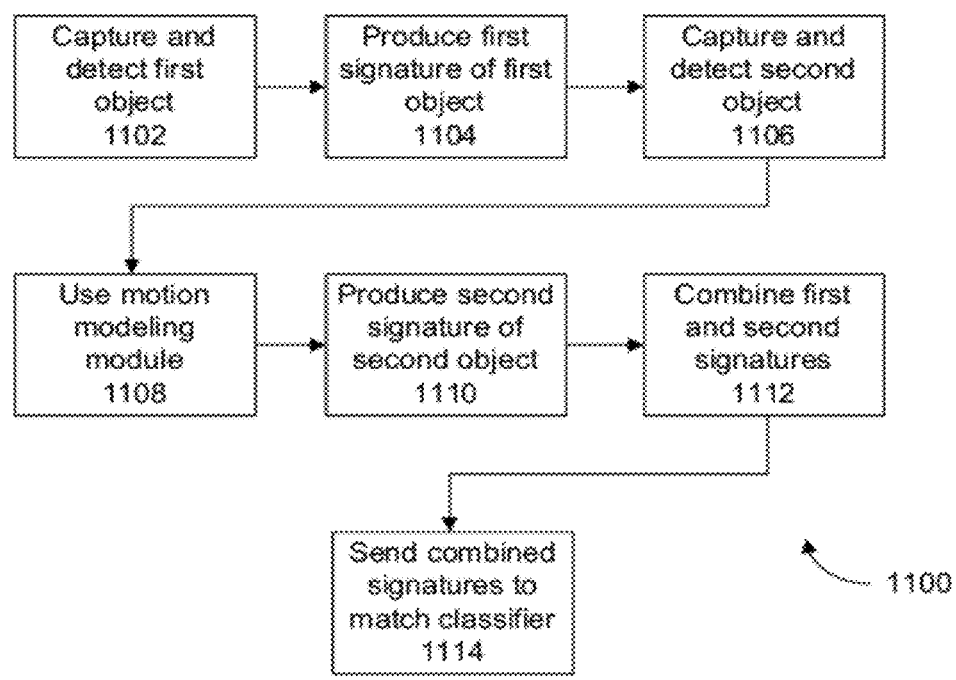
FIG. 11 is a flow chart of an object tracking method.

FIG. 11 is a flow chart of a tracking process 1100 that may be used by the object tracking module 206. A first object is captured in a first image and detected (step 1102). A first signature of the first object is produced (step 1104). The first signature may include one or more of the features described above. The first object may be included in the list of tracked objects. A second object is captured in a second image and detected (step 1106). The object tracking module 206 may use the motion modeling module 1102 to rank the second object's likelihood of corresponding to the first object based upon the first object's estimated trajectory and velocity (step 1108). A second signature of the second object is produced (step 1110). The second signature may include one or more of the features described above. Step 1110 need not occur after step 1108 (i.e., the second signature may be produced before the motion modeling module 1102 is used). The first and second signatures are combined as described above (step 1112). For example, the different features (e.g., histograms) are combined. The combined signatures are transmitted to the match classifier 218, and the match classifier 218 determines whether the first and second signatures match (step 1114). The match classifier 218 declares a match or a non-match, together with a match confidence level. If the match classifier 218 determines that the first and second signatures match, the first signature is updated as described below and other metadata may be generated such as, but not limited to, motion information (e.g., velocity, trajectory), information corresponding to the number of frames in which the first object is detected, the object's location and size (e.g., the size of a bounding box surrounding the object), the object's type (e.g., classification label determined by the temporal object classification module 208), a classification confidence level, and a match confidence level.

As described above, the match classifier 218 may use object signatures to determine whether objects match (i.e., whether objects are instances of each other). Different signatures may be generated for each object. For example, a single-frame signature and a cumulative signature may be used by the match classifier 218 during tracking. A single-frame signature (e.g., an instantaneous signature) may represent an object's appearance in a particular video frame (i.e., a single image of the object). A single-frame signature may include one or more of the features described above (e.g., histograms) computed based upon the corresponding frame. A single-frame signature may be generated for every instance of an object. The second signature described in the previous paragraph may be a single-frame signature. A cumulative signature may be a weighted average of a sequence of single-frame signatures. A cumulative signature may represent the appearance of an object being tracked (e.g., an object in the list of tracked objects). Using a cumulative signature for a tracked object rather than a single-frame signature may be more robust to noise because a cumulative signature is averaged over multiple frames. The first signature described in the previous paragraph may be a cumulative signature.

A cumulative signature may be updated whenever a tracked object is matched to a new instance by the match classifier 218. For example, the cumulative signature may be updated in real-time as new images of an object are captured. Moreover, the contribution of each single-frame signature may be reduced (e.g., exponentially reduced) corresponding to time. Thus, the most recent single-frame signatures may contribute the most to a cumulative signature. A cumulative signature may be represented mathematically as follows:

$$c_{object} = \rho c_{object} + (1-\rho) i_{observation} \qquad (13)$$

where $c_{object}$ represents the cumulative signature, $i_{observation}$ represents a single-frame signature corresponding to an instance of an object, and $\rho$ is a discount factor in which $0 < \rho < 1$. When an object is first detected, the cumulative signature may be equal to the single-frame signature, and may thereafter correspond to equation (13) for subsequent detections.

A third type of signature—an average signature—may also be generated for an object. Like a cumulative signature, an average signature of an object includes contributions from single-frame signatures of the object. Unlike the cumulative signature, however, the single-frame signatures contributing to the average signature are not weighted differently. In other words, the contributions from single frame signatures are not reduced according to time. Thus, an average signature may represent the sum of a set of single-frame signatures divided by the number of single-frame signatures of the set. The following equation is a mathematical representation of an average signature $a_{object}$ of an object:

$$a_{object} = \frac{1}{n} \sum_{1}^{n} k_i \qquad (14)$$

where the object has been tracked for n frames and $k_i$ represents the single-frame signature for the $i^{th}$ frame. The average signature may be updated in real-time as new single-frame signatures are generated.

The category or class of objects may also be taken into consideration during tracking. In many applications, specific categories or classes (e.g., humans, vehicles, animals) of objects are tracked. The object categorization module 216 is operable to categorize an object in each frame as either one of the classes of interest or as "unknown." The object categorization module 216 is operable to use object class information and other information to generate an order in which tracked objects are matched with objects of a current frame. For example, the "importance" of a tracked object may correspond to the number of frames in which the tracked object was classified as something other than "unknown." Thus, noisy observations corresponding to moving leaves, water, camera noise and the like may have low importance because the noisy observations may usually be classified as "unknown." The object categorization module 216 may attempt to match noisy observations last, which may reduce the possibility of erroneously matching an "unknown" observation to a object of interest, such as a human or vehicle. The object categorization module 216 may be useful when a large number of objects are captured in a current frame and sufficient resources may not be available to track all of the objects. In that case, the "importance" of tracked objects may be used to determine an order for tracking in which the most important objects are tracked first.

Figure 12:
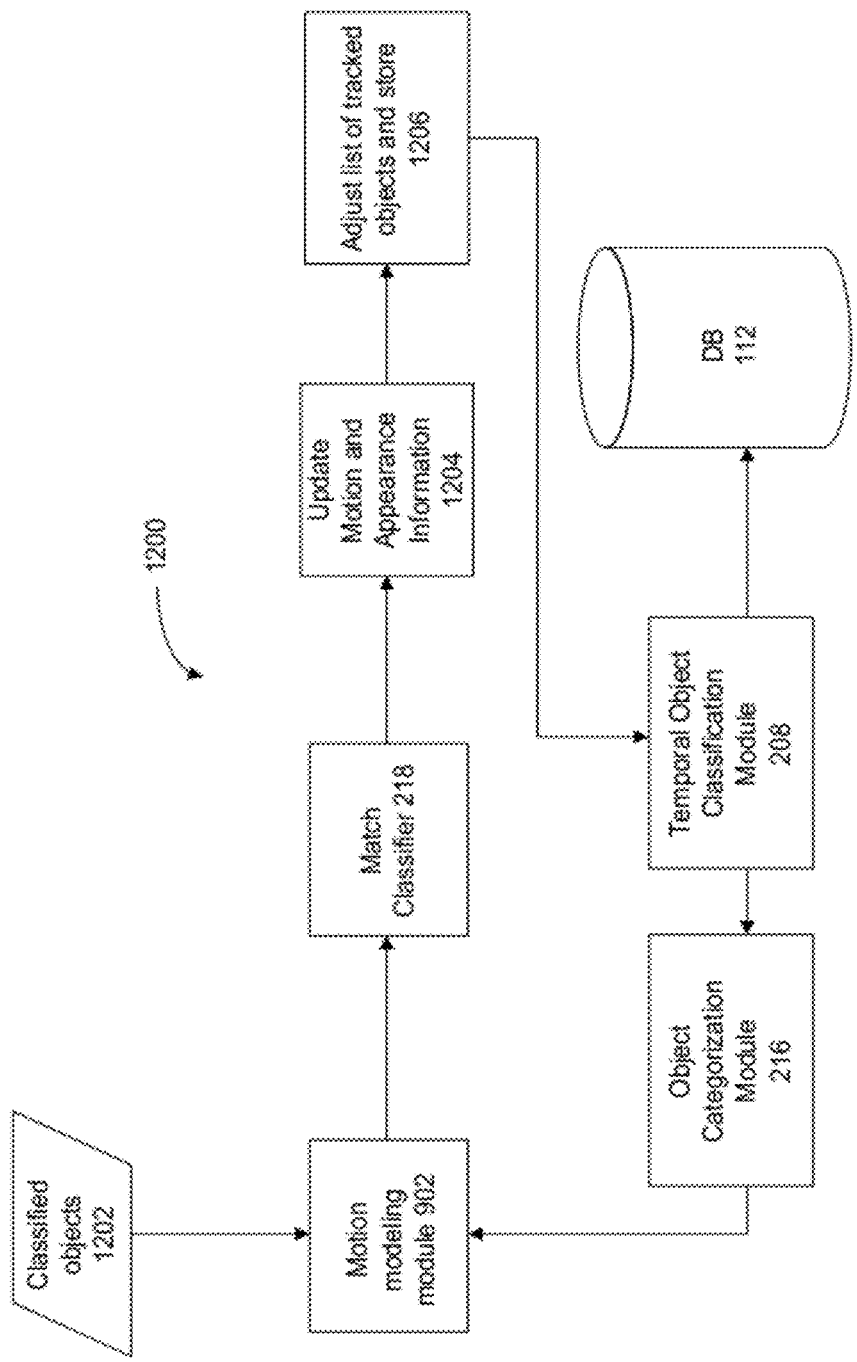
FIG. 12 is a hybrid block diagram and flow chart of another object tracking system.

FIG. 12 is a hybrid block diagram and flow chart of a method 1200 of tracking an object using class information and the modules involved in that method. Objects are detected in a current frame and the object classification module 210 classifies the objects of the current frame as either a member of one of the object classes (e.g., human, vehicle) or as "unknown." Data representing the classified objects 1202 are supplied to the motion modeling module 902. Data representing a list of tracked objects are also supplied from the object categorization module 216 to the motion modeling module 902. The tracked objects are objects that have been observed in recent frames. The object categorization module 216 identifies the "importance" of each tracked object based upon the number of frames in which the temporal object classification module 208 indicates that the tracked object was classified as a member of a class of interest. For example, a user may specify that humans and/or vehicles are classes of interest. Thus, the more frames in which a tracked object is classified by the object classification module 210 as a human or vehicle, the greater the "importance" of the tracked object. The object categorization module 216 may sort the list of tracked objects according to importance. The data supplied from the object categorization module 216 to the motion modeling module 902 indicates the importance of each of the tracked objects and also includes motion information (e.g., position, trajectory, velocity) for each of the tracked objects.

The motion modeling module 902 receives the data representing the list of tracked objects and the data representing the classified objects 1202. The motion modeling module 902 begins with the most important tracked object from the list (e.g., a first tracked object) and ranks the classified objects 1202 based on their likelihood of corresponding to the first tracked object. Signatures of likely matches are combined with the signature of the first tracked object, and the combined signatures are transmitted to the match classifier 218 to determine whether a classified object 1202 matches the first tracked object. If a classified object 1202 matches the first tracked object, motion information (e.g., position, trajectory, velocity) and appearance information (e.g., cumulative signature) of the first tracked object are updated (step 1204). Additionally, when a classified object 1202 matches the first tracked object, the class of the classified object is transmitted to the temporal object classification module 208 so that the "importance" of the first tracked object can be updated. If none of the classified objects 1202 match the first tracked object, information is generated to indicate a non-match. The information indicating a non-match may be transmitted to the temporal object classification module 208 and the "importance" of the first tracked object may be updated.

If a tracked object is not matched for a predetermined amount of time (e.g., the object may have left the scene), the list of tracked objects may be updated by removing the tracked object (step 1206). When a tracked object is removed from the list, the object's information (e.g., identification number, signature, class) may be transmitted to the metadata database 112 for storage. Additionally, if a classified object 1202 does not match any of the tracked objects, the classified object 1202 may be added to the list of tracked objects (step 1206).

Figure 13A:
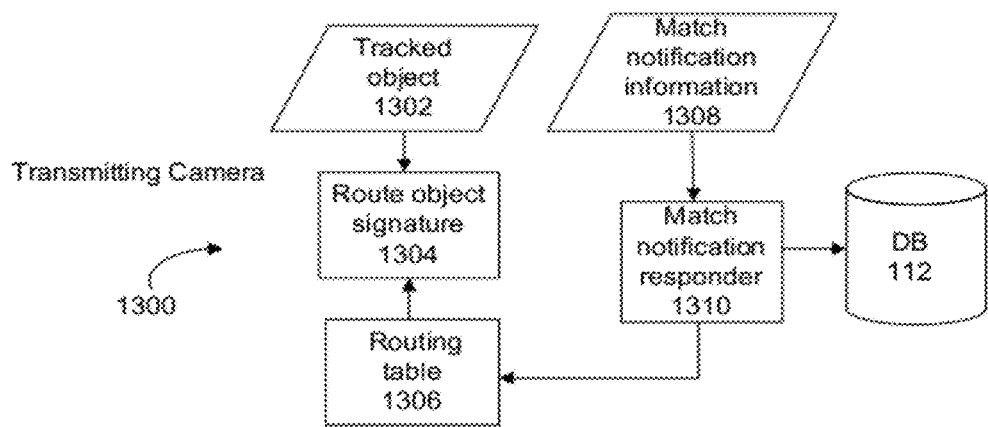
FIGS. 13A and 13B are hybrid block diagrams and flow charts of an inter-camera tracking method.
Figure 13B:
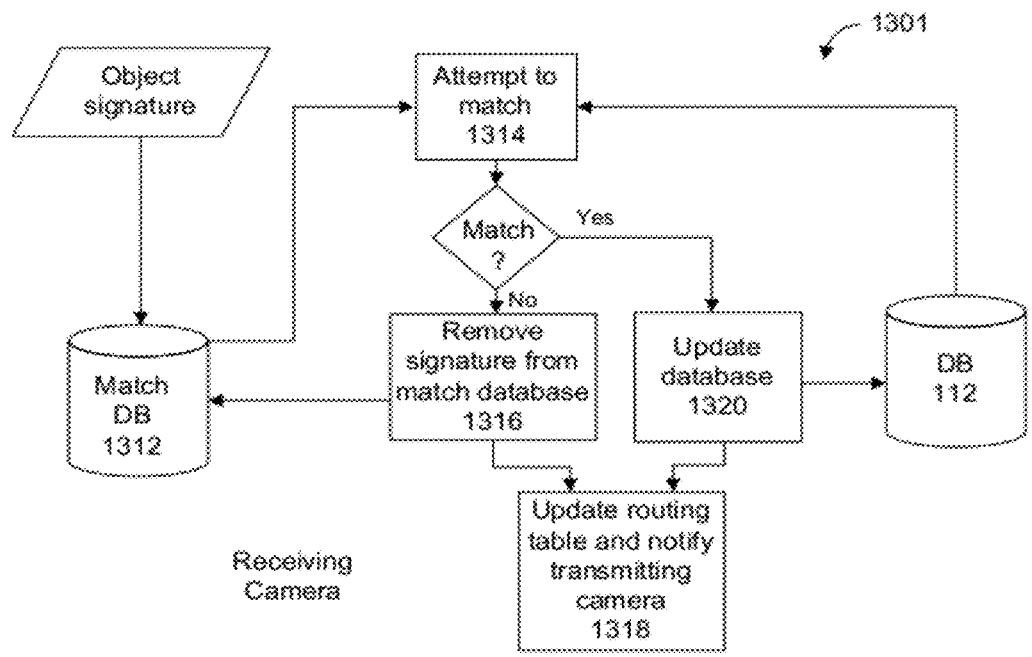

The camera system 100 may also be operable to perform inter-camera tracking, or tracking between multiple image capturing devices 102. FIGS. 13A and 13B are hybrid block diagrams and flow charts of inter-camera tracking processes 1300 and 1301 used by, respectively, a transmitting camera and a receiving camera. A first image capturing device 102 (e.g., the transmitting camera) detects an object in its field of view and tracks the object for a number of frames. The tracked object 1302 may have its signature routed to other image capturing devices 102 (e.g., receiving cameras) (step 1304). The signature that is routed may be an average signature of the tracked object 1302. The signature may be transmitted to all image capturing devices 102 of the camera system 100, or to certain image capturing devices 102 according to a routing table 1306. The routing table 1306 may include information corresponding to the probability that an object has appeared or will appear in a receiving camera's field of view within a certain time period after or while the object appears in the transmitting camera's field of view. The routing information is generated over time as the transmitting camera transmits signatures to receiving cameras, and as the receiving cameras report back to the transmitting camera match notification information 1308 indicative of matches and/or non-matches. For example, a receiving camera located far away from the transmitting camera may rarely, if ever, report a match because an object being tracked by the transmitting camera may not be captured by the receiving camera within a predetermined time period (e.g., the object cannot move fast enough between the transmitting camera's field of view and the receiving camera's field of view). Thus, probability information may be used to selectively transmit signatures to certain cameras so as to not burden other cameras with matching tasks when the probability of the other cameras capturing the object within a predetermined time period is low.

The match notification information 1308 is received by a match notification responder 1310 that uses the match notification information 1308 to update the probabilities of the routing tables. For example, if a receiving camera reports a match, the match notification responder 1310 may increase the probability in the routing table corresponding to that receiving camera. The match notification information 1308 may also include signature information corresponding to the object matched by a receiving camera. The match notification responder may update the signature of the object when a receiving camera detects a match and store the updated signature in the metadata database 112. Information identifying the receiving camera that matched the object may also be stored in the metadata database 112.

As shown in FIG. 13B, an object signature transmitted from the transmitting camera to a second image capturing device 102 (e.g., receiving camera) is stored in a match database 1312 of the receiving camera. The match database 1312 may be part of the storage system 100. The signature of the object is combined with one or more active signatures of objects being tracked by the receiving camera. The active signatures of the objects being tracked may be average signatures and may be stored in the metadata database 112 of the receiving camera. The combined signatures are transmitted to the match classifier 218 of the receiving camera, and the match classifier 218 attempts to match the signatures for a predetermined number of frames (step 1314). If the match classifier 218 determines that the transmitted signature does not match one of the active signatures for the predetermined number of frames, the transmitted signature is removed from the match database 1312 (step 1316). The routing table of the receiving camera is updated (e.g., the probability of a match corresponding to the transmitting camera is decreased), and the receiving camera notifies the transmitting camera of the non-match (step 1318). If the match classifier 218 determines that the transmitted signature matches one of the active signatures, the corresponding active signature may be updated (e.g., the transmitted signature is averaged with the active signature) and stored in the receiving camera's metadata database 112, and/or the transmitted signature may be stored in the receiving camera's metadata database 112 as a new signature for the object (step 1320). The routing table of the receiving camera is then updated (e.g., the probability of a match corresponding to the transmitting camera is increased) and the receiving camera notifies the transmitting camera of the match (step 1318).

Inter-camera tracking may be used for automatic camera calibration. For example, if the location of an object in the field of view of each of multiple image capturing devices 102 is known, and if the approximate size of the object is known, then the distance between the image capturing devices 102 and their relative orientation can be calculated. Following calibration, the location of an object simultaneously tracked by the multiple image capturing devices 102 can be determined in three-dimensional (3-D) "world" coordinates. Thus, the system can analyze motion of objects not only in a two-dimensional image plane, but also in 3-D.

By implementing the object tracking module 206 and the match classifier 218, object tracking may be significantly improved over known tracking systems. Moreover, data generated by the object tracking module 206 may be supplied to the object detection module 204 and the object classification module 210 to improve object detection and object classification. Additionally, objects may be accurately tracked in real-time.

Indexing

The signatures of objects act as index elements for the images or video clips in which the objects are captured. The index elements enable retrieval of the video clips of the objects when the objects are selected. The signatures may be stored in the metadata database 112. The signatures may be compact compared to the images or video clips associated with the objects. Moreover, the signatures may enable object-based searching. Once a signature is generated for an object, tracking and searching processes may be independent of video images of the object. Thus, video information need not be uncompressed to perform searches, and the search process may be resilient to uncompressed artifacts and/or poor video quality.

Each object may have more than one signature associated with it. For example, an object may have multiple single-frame signatures and cumulative and average signatures comprising the single-frame signatures. An object's average signature may be useful for acting as an index element for the object.

A single average signature computed over the entire duration in which an object is tracked, however, may not be suitable to enable object-based searching because the appearance of an object may be multi-modal or may vary over time (e.g., a front view of an object versus a side view, lighting changes, views of different portions of the object). Thus, the object indexing module 212 is operable to determine when to generate a new average signature for an object. Moreover, the object indexing module 212 may be operable to call on the match classifier 218 to determine whether an object's appearance has changed enough such that a new average signature should be generated for the object.

Figure 14:
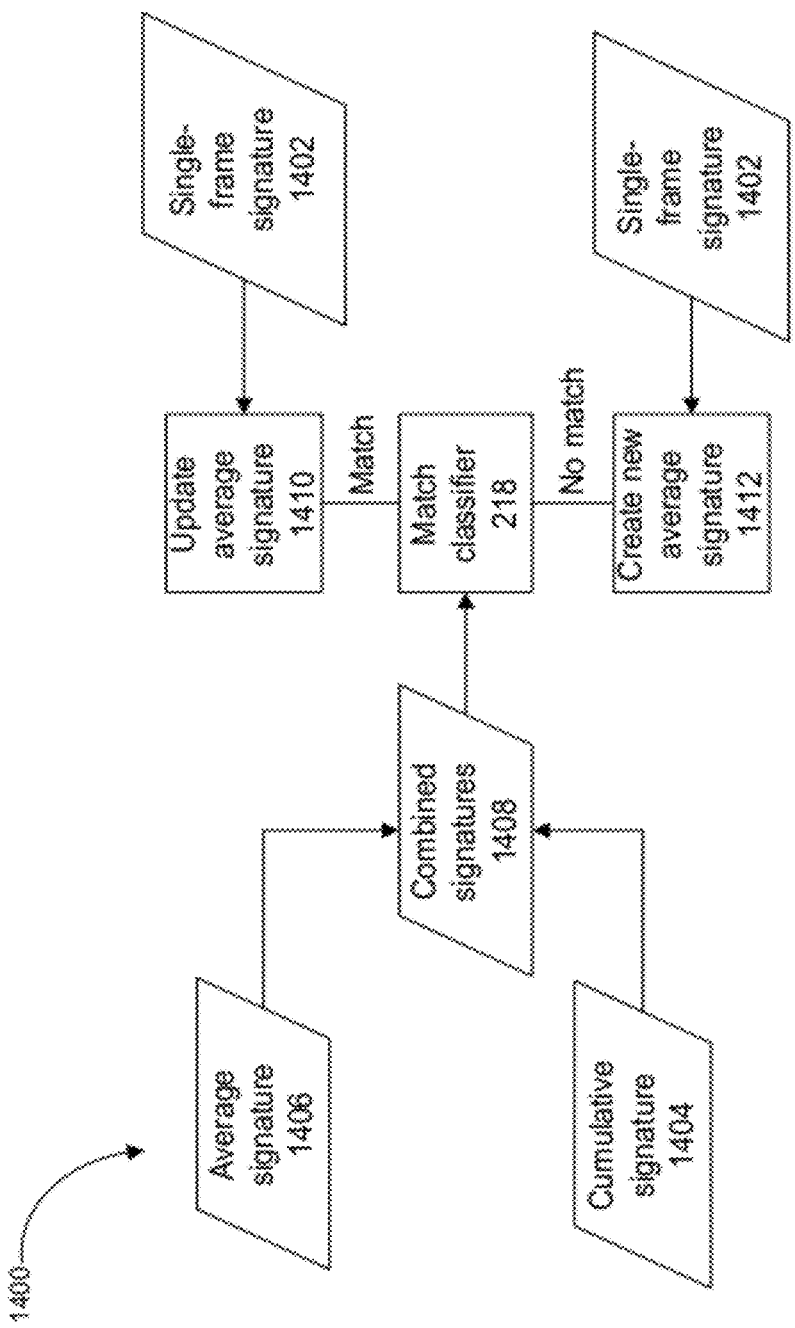
FIG. 14 is a block diagram of an object indexing system.

FIG. 14 is a block diagram showing how the match classifier 218 may be used for indexing. When a new single-frame signature 1402 of an object is generated from a new instance of an object and the new instance is matched by the match classifier 218 with a tracked object, the tracked object's cumulative signature 1404 is updated with respect to the single-frame signature 1402. After the cumulative signature 1404 is updated, the cumulative signature 1404 is combined with the tracked object's average signature 1406. The combined signatures 1408 is supplied to the match classifier 218. If the match classifier 218 determines that the cumulative signature 1404 and the average signature 1406 match, the average signature is updated with respect to the single-frame signature 1402 (block 1410). If the match classifier 218 determines that the cumulative signature 1404 and the average signature 1406 do not match, a new average signature is created using the single-frame signature 1402 (block 1412). The new average signature may be stored in the metadata database 112 as a second index element for the object. If the tracked object has multiple average signatures, the cumulative signature 1404 may be compared to each of the multiple average signatures, and a new average signature may be created when the cumulative signature 1404 does not match any of the multiple average signatures. As described above, the same match classifier 218 used to track objects may be used to detect appreciable changes in an object's appearance, and, thus, a new index element may be generated by using the match classifier 218.

Searching

The signatures or index elements stored in the metadata database 112 may facilitate searching a large database of objects quickly for a specific object because actual pixel information from video images does not need to be reprocessed. The object search module 214 may use the same match classifier 218 used for tracking and indexing to search for a specific object. The match classifier 218, together with the signatures of objects, enable object-based searches in both historical video and real-time video feeds.

Figure 15:
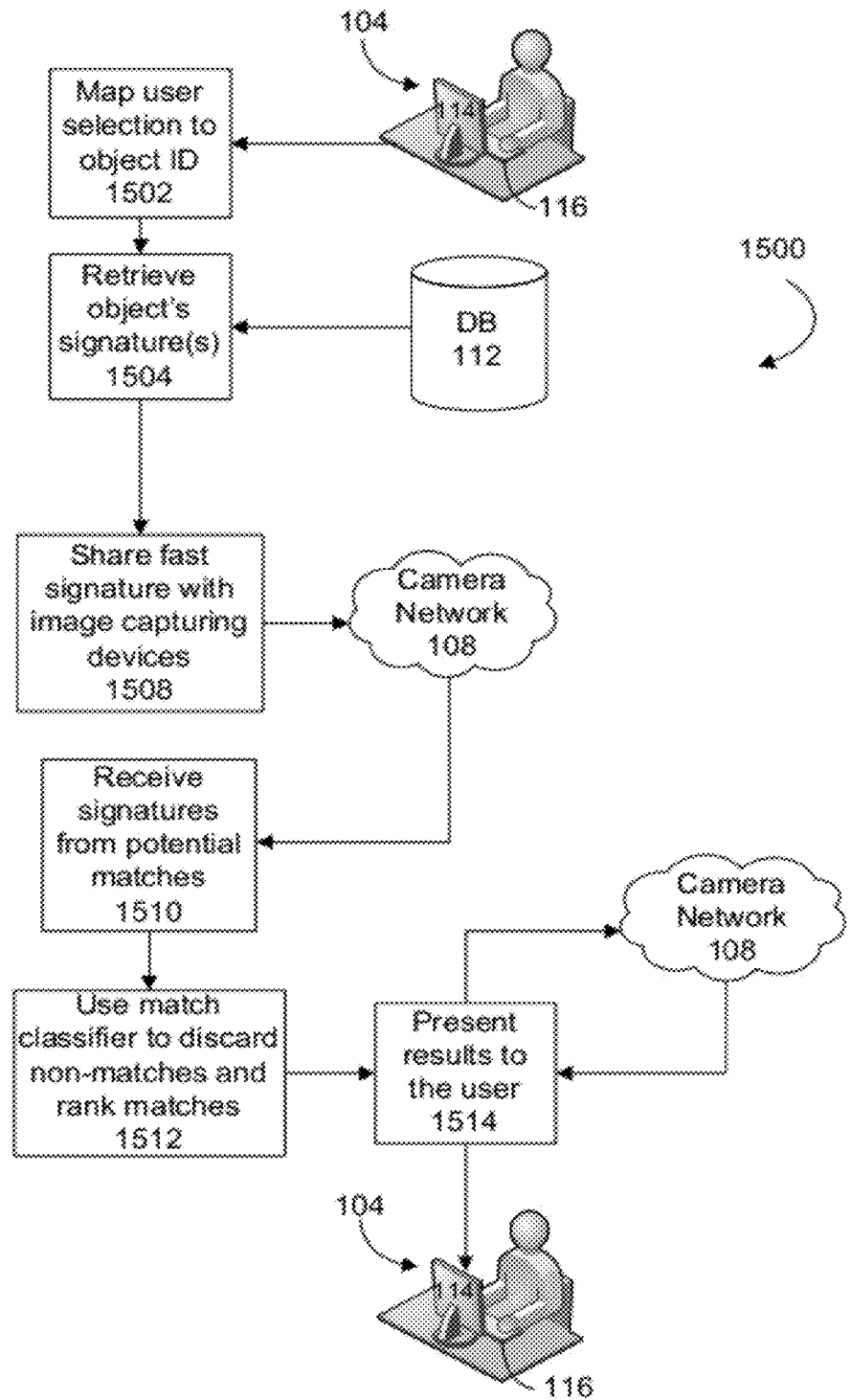
FIG. 15 is a pictorial diagram of an object search method.

FIG. 15 is a pictorial diagram of a search process 1500 that may be performed by the camera system 100 by way of example only; the process 1500 is operable with any suitable camera system. One of the image capturing devices 102 captures an image of a reference object, and the image of the reference object is presented on the display 114 of the user interface 104. The reference object may be highlighted for the user by, for example, presenting a box outline around the image of the reference object. The user may use the input device 116 to select the reference object. For example, the input device 116 may include a mouse, and the user may click a pointer on the image of the reference object using the mouse. Thus, the image of the reference object may be considered a hyper-tag (somewhat similar to a hyper-link in an HTML page). When the user selects the reference object, the selection is mapped to the reference object's identification number generated by the object tracking module 206 of the image capturing device 102 that captured the image of the reference object (step 1502). The reference object's identification number is used by the object search module 214 to retrieve the reference object's signature from the metadata database 112 (step 1504). The signature retrieved may be the reference object's average signature, and if the reference object has multiple average signatures, the multiple average signatures may be retrieved.

In addition to the average signature, one or more fast signatures of the reference object may be retrieved from the metadata database 112. A fast signature may be a simple appearance descriptor computed from an average signature. The fast signature may be computed by discarding some of the features contained in the average signature by reducing the number of bins in a histogram, for example, or by computing statistics over the features (e.g., maximum or entropy statistics). The fast signature may be used to quickly reduce the search space of stored signatures by removing candidate objects that most likely do not match the first object. In addition to the fast signature, other criteria may be used by the object search module 214 to quickly prune out obvious non-matches. For example, the object search module 214 may use the reference object's class to eliminate candidate objects. Moreover, the object search module 214 may eliminate candidate objects based on time (e.g., eliminate candidate objects that were detected prior to a predetermined time frame) and/or based on one or more rule violations associated with the reference object (e.g., eliminate candidate objects that did not trigger similar rule violations).

The fast signature(s) of the first object are transmitted to the other image capturing devices 102 over the camera network 108. The metadata databases 112 of the other image capturing devices 102 are searched for fast signatures of candidate objects that match the fast signature(s) of the reference object. The object search modules 214 of the other image capturing devices 102 compare the fast signature(s) of the reference object with the fast signatures of the candidate objects by computing a distance measure between the signatures. The distance measure may then be compared to a predetermined threshold. The threshold may be set such that the false negative rate (e.g., rate of discarding matches) is low, but the false positive rate (e.g., rate of accepting non-matches) may be high. If the object search modules 214 determine that one or more fast signatures of the candidate objects match the fast signature of the reference object, the object search modules 214 retrieve the average signatures of the corresponding candidate objects.

The average signatures of the candidate objects are transmitted to the image capturing device 102 that captured the image of the reference object or to the remote storage/processing unit 106 (step 1510). The match classifier 218 of the image capturing device 102 or the match classifier 218 of the remote storage/processing unit 106 is used to compare the average signature(s) of the reference object to the average signatures of the candidate objects (step 1512). The match classifier 218 compares the average signatures to discard non-matches and to rank matches based on the match confidence level associated with the matches. Once the matches are ranked, a list including representations of the ranked matches may be presented on the display 114 (step 1514). Additionally, video images corresponding to the candidate objects of the matches are retrieved over the camera network 108 from one or more of the storage systems 110, or from the remote storage/processing unit 106. The user may select a representation of a candidate object from the list, and the video images of the selected candidate object may be presented on the display 114.

The metadata database 112 of the image capturing device 102 that captured the image of the reference object may also be searched to identify signatures of potential matches, similar to the process 1500 described above. For example, the object search module 214 of the image capturing device 102 may search the fast signatures first and then call on the match classifier 218 to compare the average signature of the reference object to the average signatures of the potential matches. Moreover, although process 1500 includes matching with the match classifiers 218 located at either the image capturing device 102 that captured the image of the reference object or the remote storage/processing unit 106, a match classifier 218 associated with any other image capturing device 102 may be used. In other words, matching may be performed at one or more image capturing device 102 or at the remote storage/processing unit 106.

The match classifier 218 and the object search module 214 enable a form of searching that may be referred to as "click and search." A user may be reviewing historical video from a variety of image capturing devices 102. If a particular object appears interesting, the user can search for all objects that look like the particular object. Moreover, video clips of look-a-like objects may be played for the user. The search may be performed over all the image capturing devices 102 of the camera system 100 or over any user-specified subset. Because the video does not have to be reprocessed to perform a search, the search may be performed quickly.

The match classifier 218 and the object search module 214 also enable a form of searching that may be referred to as "click and track." In addition to performing searches with respect to historical video, searches may be performed for instances of an object that has just appeared in a live video feed. Much like intra-camera tracking, the user interface 104 requests (in response to a user selection) that the image capturing device 102 that captured an object of interest transmit the signature of the object the image capturing devices 102 in the network 108. If a match is found, the user interface 104 is notified and the images of the object of interest are presented on the display 114.

While reviewing video data retrieved from an object search, a user can validate or invalidate a match. For every match that is validated by a user, a link in the metadata database 112 may be created and the corresponding signatures may be updated. For invalid matches, signatures may be designated as exclusions to matching against the object's signature. User validation data can be stored in the metadata database and retrieved later to re-train match classifier 218, resulting in further improvement of search and inter-camera tracking results as well as intra-camera tracking results. Additionally, user validation may be used to tune search results Applications The systems and methods described above may be used to create a number of applications. Examples of some of these applications are presented in the following paragraphs.

Compared to known systems that create tracking information only when a rule established by a rules engine has been violated, the camera system 100 creates rich tracking metadata whether a rule is violated. This enables post searching, or searching video images that were captured before a rule is violated. Moreover, because metadata is generated that includes object appearance characteristics, an object may be recognized as a member of a newly created object class even though an image of the object was captured prior to creation of the new object class.

Known tracking systems have problems with losing track of objects. For example, if a person walks behind a park bench, the person's legs might not be visible. A known tracking system might consider the person too short to be a person. As a result, the person may be tracked until the person walks behind the park bench. Because the camera system 100 may use many different appearance characteristics, the camera system 100 may avoid losing track of objects when they are still present within the field of view. Moreover, the match classifier 218 may make tracking more adaptable to environmental changes and may improve detection across different camera types (and from camera to camera in general) compared to known systems.

Because the match classifier 218 is trainable, new features of objects may be selected to improve detection and tracking accuracy. The match classifier 218 may learn the features that are most important in the pre-deployment training phase, and may also learn while in the field to improve tracking accuracy.

By establishing semantic links between video streams and objects detected, a video history can be created for a particular object. For instance, by selecting a human object, a user may automatically summon video clips showing where the person had been detected previously by other cameras. The user may then notice companions of the person in question, and may select those companions and view their video histories. Because metadata corresponding to the object's appearance signature is linked in the database with video data corresponding to the location where it was detected, the image itself may be used as a selectable link for searching the database.

When an object is captured by one image capturing device 102, the systems and methods described may also be used to notify and engage all other image capturing devices 102, so that they may automatically begin searching for the same object and create an alert if it is detected. For example, an individual person may be followed through a casino monitored by dozens of cameras with adjacent, overlapping fields of view, by just clicking on an image and instructing the system to track the image across all cameras. As soon as an appearance signature of the person is detected, the system automatically directs live video data from the corresponding camera to a monitor that allows security personnel to visually track the person. As the person moves into the field of view of the next camera, the video feed is automatically switched so that it is not necessary for security personnel to switch back and forth between cameras to continue tracking the person's path.

The camera system 100 may automatically recognize pedestrians leaving a parked car, and can compare them later to people entering the car. If a person entering a car is not from the original group who arrived in the car, security personnel may be alerted. Video clips are automatically sent with the alert, so that it is easy to review and quickly determine whether there is a problem. A security guard may then opt to either inform the car owner (if the car is registered by license plate number) or summon police.

With the ability to track objects, fraud can be detected by following the path of individual shoppers through a retail store. With this capability the system disclosed may be taught to verify whether shoppers exiting a store with merchandise have visited a checkout counter and purchased the merchandise before leaving the store. The system may also determine whether customers at a return counter came straight from their cars, or whether they first passed through the store, selected products from the store, and attempted to return them as though they had purchased the products. The return counter attendant can be shown a clip of the customer entering the store and their path through the store, as verification.

When combined with object matching, performance of facial recognition and vehicle license plate recognition systems can be improved. Object matching may provide good tracking capability by overall appearance and movement and can track people in any orientation, not just when they are aligned to face the camera.

The camera system 100 may also be configured to automatically recognize abnormal activity by monitoring vehicle and pedestrian patterns over days or weeks. High risk facilities concerned about potential terrorist activities may benefit from this feature. If the camera system 100 repeatedly recognizes a vehicle parked for an extended period of time with no one exiting the vehicle, an alert of suspicious activity may be generated to summon security personnel to review the video data. Alternatively, object matching combined with a facial recognition system may recognize individuals who walk around a facility repeatedly. Such action may catch a criminal casing a facility. In another example, if uniformed employees regularly visit a special lunch room or inventory room, for example, the camera system 100 can recognize this pattern. Later, if someone not wearing such a uniform enters one of these rooms, the camera system 100 may respond with an automatic alert.

The camera system 100 may be used to measure how many people are standing in a line at, for example, a cash register and to generate an alert corresponding to a rule of a rules engine. Additionally, the camera system 100 may be used to measure how long each person has been standing in the line because the system 100 can track each individual. If a person has been standing in the line too long, a rule of the rules engine may be violated and an alert may be generated to summon assistance (e.g., an alert to open a new cash register line). Moreover, statistics may be generated for managers to help measure customer service performance.

The camera system 100 may be used to help prevent child abductions at retail businesses for example. The camera system 100 may recognize children when they enter a store and an adult accompanying the child. The camera system 100 may also recognize an adult the child stays close to while walking through the store. If the child leaves the store without the adult accompanying the child, an alert may be created. The camera system 100 may also identify the location of the adult so that she/he can be notified.

The camera system 100 may be used to locate lost children at retail businesses. For example, if a parent loses its child and notifies a security guard, the security guard can find an image of the parent, click on the image to search through other video images and identify an image when the parent entered the store with the child. The security guard may then click on an image of the child and search the image capturing device 102 that most recently captured an image of the child. This quickly locates the child's location in the store.

The camera system 100 may be use to prevent a problem called "sweetheart fraud," which happens when a checkout person intentionally swipes the bar code of a low cost item while acting as though they are swiping the bar code of a more expensive item. The camera system 100 may be connected to the point-of-sale (POS) data outputs of a cash register and may compare the appearance of products with the bar code information. Over a period of time, the camera system 100 may automatically create in the metadata database 112 appearance signatures for different products. After the camera system 100 has reached a level of accuracy for product recognition, which the camera system 100 can determine itself, it can automatically begin creating alerts whenever the bar code information does not match the image being scanned.

The camera system 100 may automatically tag video for higher priority based on its similarity to footage in which a critical event is detected. For example, if a laptop is stolen from a work area, the camera system 100 may be able to automatically recognize the laptop from historical video and may recognize the person closest to the laptop when it went missing. The camera system 100 may then automatically designate all video images of the suspicious person to be of higher priority for storage, retention, or retrieval and review by security personnel.

Conclusion

The methods and systems illustrated and described herein can exist in a variety of forms both active and inactive. For example, they can exist partly or wholly as one or more software programs comprised of program instructions in source code, object code, executable code or other formats. Any of the above can be embodied in compressed or uncompressed form on a computer-readable medium, which include storage devices. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes.

The terms and descriptions used above are set forth by way of illustration only and are not meant as limitations. For example, the match classifier 218 may be part of—and the classification methods may be performed at—a remote processing unit, such as the remote storage/processing unit 106 (FIG. 1), a computer associated with the user interface 104, another node in the camera network 108, or another server, such as one at a central location or on another network. Those skilled in the art will recognize that many variations, enhancements and modifications of the concepts described herein are possible without departing from the underlying principles of the invention. The scope of the invention should therefore be determined only by the following claims and their equivalents.

The invention claimed is:

1. A method of tracking an object captured by a camera system, comprising:
 receiving image data representing first and second images acquired by the camera system;
 detecting a first object captured in the first image and a second object captured in the second image;
 producing a first signature of the first object and a second signature of the second object, the first signature representing a first set of features of the first object and the second signature representing a second set of features of the second object;
 producing data derived from the first and second signatures; and
 analyzing the data with use of a match classifier including a set of match and non-match parameters that populate a feature classification space, and the match classifier including multiple decision steps performed to determine whether the second object is an instance of the first object, each of the multiple decision steps performed by the match classifier analyzing with reference to the set of match and non-match parameters to produce decision results that include accepting the first and second objects as a match or rejecting the first and second objects as a match.

2. The method of claim 1, further comprising determining that the second object is an instance of the first object.

3. The method of claim 1, further comprising producing the second signature in real time.

4. The method of claim 1, further comprising combining portions of the first and second signatures to produce the data.

5. The method of claim 1, wherein the match classifier includes N decision steps configured in a cascade configuration, and each of the N decision steps includes one or more stages for analyzing portions of the data.

6. A method of tracking an object captured by a camera system, comprising:
 receiving image data representing first and second images acquired by the camera system;
 detecting a first object captured in the first image and a second object captured in the second image;
 producing a first signature of the first object and a second signature of the second object, the first signature representing a first set of features of the first object and the second signature representing a second set of features of the second object;

producing data derived from the first and second signatures, the data corresponding to a first subset of features selected from the first set and a second subset of features selected from the second set, the first subset of features having appearance features including a first edge orientation histogram of the first object, and the second subset of features having appearance features including a second edge orientation histogram of the second object; and analyzing the data with use of a match classifier that includes N number of multiple decision steps configured in a cascade configuration and performed to determine whether the second object is an instance of the first object, and each of the N decision steps including one or more stages for analyzing portions of the data.

7. The method of claim 6, further comprising mapping a portion of the data derived from the first and second edge orientation histograms to a scalar value representing a measure of similarity.

8. The method of claim 1, wherein the first signature is a cumulative signature representing a weighted average of single-frame signatures derived from multiple images of the first object, and further comprising, upon determining that the second object is an instance of the first object, updating the first signature of the first object by including the second signature in the cumulative signature.

9. The method of claim 1, wherein the camera system includes first and second image capturing devices connected to each other in a network, further comprising:
capturing with the first image capturing device the first image of the first object; and
capturing with the second image capturing device the second image of the second object.

10. The method of claim 9, wherein the first image capturing device includes the match classifier for analyzing the data, the method further comprising:
transmitting the first signature from the first image capturing device to the second image capturing device.

11. The method of claim 9, wherein a processor remote from the first and second image capturing devices includes the match classifier for analyzing the data, the method further comprising:
transmitting to the processor the first and second signatures from, respectively, the first and second image capturing devices.

12. The method of claim 1, wherein the data correspond to a first subset of features selected from the first set and a second subset of features selected from the second set, and wherein a training process automatically determines the features of the first and second sets that are to be selected for inclusion in the first and second subsets.

13. The method of claim 1, further comprising searching signatures of a set of previously detected objects to identify whether the second object appears in images of the set of objects.

14. A method of finding an object captured by a camera system, comprising:
receiving image data representing first and second images acquired by the camera system;
detecting a first object captured in the first image and a second object captured in the second image;
producing a first signature of the first object and a second signature of the second object, the first signature representing a first set of features of the first object and the second signature representing a second set of features of the second object;
displaying the second image of the second object on a display;
accepting user input indicative of a selection of the second signature of the second object;
analyzing, with reference to a set of match and non-match parameters that populate a feature classification space of a match classifier, whether the second signature matches the first signature to determine whether the second object is an instance of the first object;
producing a notification indicating a match between the first and second signatures to indicate a match between the first and second objects; and
sending the notification to enable responsive action to the indication of a match.

15. The method of claim 14, further comprising searching signatures of a set of previously detected objects to determine whether the second object matches one of the previously detected objects.

16. The method of claim 15, wherein the set of previously detected objects has been detected by multiple cameras, and the searching includes searching the signatures of the set of previously detected objects detected by the multiple cameras.

17. The method of claim 15, further comprising using selection criteria to filter objects that are members of the set of previously detected objects and that match the second signature of the second object.

18. A method of detecting an object of interest by a camera system, comprising:
receiving image data representing the first and second images acquired by the camera system;
detecting a first object captured in the first image and a second object captured in the second image;
producing a first signature of the first object and a second signature of the second object, the first signature representing a first set of features of the first object and the second signature representing a second set of features of the second object;
displaying the first image of the first object on the display;
accepting user input indicative of a selection of the first object;
analyzing, with reference to a set of match and non-match parameters that populate a feature classification space of a match classifier, whether the second signature matches the first signature to determine whether the second object is an instance of the first object;
producing a notification indicating a match between the first and second signatures to indicate a match between the first and second objects; and
sending the notification to enable responsive action to the indication of a match.

19. The method of claim 18, further comprising monitoring images captured by the camera system in accordance with a rule created in the camera system to watch for objects identified by a signature that matches the first signature.

20. The method of claim 18, wherein the rule created causes the camera system to watch for objects of interest captured in images acquired by multiple cameras.

21. The method of claim 19, wherein the rule specifies criteria for determining when an object is considered an object of interest.

22. The method of claim 18, wherein the selection of the first object includes selection of the first signature of the first object.

* * * * *